US011900111B2

(12) United States Patent
Sudarsanan et al.

(10) Patent No.: US 11,900,111 B2
(45) Date of Patent: Feb. 13, 2024

(54) PERMUTATION INSTRUCTION

(71) Applicant: QUALCOMM Incorporated, San Diego, CA (US)

(72) Inventors: Srijesh Sudarsanan, Boston, MA (US); Deepak Mathew, Acton, MA (US); Marc Hoffman, Mansfield, MA (US); Gerald Sweeney, Chelmsford, MA (US); Sundar Rajan Balasubramanian, Groton, MA (US); Hongfeng Dong, Acton, MA (US); Yurong Sun, Acton, MA (US); Seyedmehdi Sadeghzadeh, Brookline, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,816

(22) Filed: Sep. 24, 2021

(65) Prior Publication Data

US 2023/0102564 A1    Mar. 30, 2023

(51) Int. Cl.
*G06F 9/30* (2018.01)

(52) U.S. Cl.
CPC ...... *G06F 9/30036* (2013.01); *G06F 9/30101* (2013.01)

(58) Field of Classification Search
None
See application file for complete search history.

(56) References Cited

U.S. PATENT DOCUMENTS

| 5,488,730 | A | * | 1/1996 | Brown, III | ............ | G06F 9/3848 |
| | | | | | | 712/217 |
| 2011/0055497 | A1 | | 3/2011 | Van Hook et al. | | |
| 2013/0091339 | A1 | | 4/2013 | Van Kampen et al. | | |
| 2014/0281372 | A1 | | 9/2014 | Ingle et al. | | |
| 2016/0224514 | A1 | * | 8/2016 | Moudgill | ............ | G06F 9/3887 |
| 2017/0177357 | A1 | * | 6/2017 | Ould-Ahmed-Vall | ...................... | |
| | | | | | | G06F 12/0875 |
| 2019/0297351 | A1 | * | 9/2019 | Said | ...................... | H04N 19/176 |
| 2021/0026627 | A1 | * | 1/2021 | Abhishek Raja | ... | G06F 9/30145 |

OTHER PUBLICATIONS

International Search Report and Written Opinion—PCT/US2022/075406—ISA/EPO—dated Dec. 13, 2022.

* cited by examiner

*Primary Examiner* — John M Lindlof
(74) *Attorney, Agent, or Firm* — Moore IP/Qualcomm Incorporated

(57) ABSTRACT

A device includes a vector register file, a memory, and a processor. The vector register file includes a plurality of vector registers. The memory is configured to store a permutation instruction. The processor is configured to access a periodicity parameter of the permutation instruction. The periodicity parameter indicates a count of a plurality of data sources that contain source data for the permutation instruction. The processor is also configured to execute the permutation instruction to, for each particular element of multiple elements of a first permutation result register of the plurality of vector registers, select a data source of the plurality of data sources based at least in part on the count of the plurality of data sources and populate the particular element based on a value in a corresponding element of the selected data source.

30 Claims, 11 Drawing Sheets

FIG. 7

PERMUTATION INSTRUCTION

I. FIELD

The present disclosure is generally related to a permutation instruction.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to perform the same operations (e.g., filtering) on multiple data values, such as sensor data captured at various times. Sequentially retrieving each data value from memory to perform an operation is time-consuming and can make some real-time applications impractical.

III. SUMMARY

According to one implementation of the present disclosure, a device includes a vector register file, a memory, and a processor. The vector register file includes a plurality of vector registers. The memory is configured to store a permutation instruction. The processor is configured to access a periodicity parameter of the permutation instruction. The periodicity parameter indicates a count of a plurality of data sources that contain source data for the permutation instruction. The processor is also configured to execute the permutation instruction to, for each particular element of multiple elements of a first permutation result register of the plurality of vector registers, select a data source of the plurality of data sources based at least in part on the count of the plurality of data sources and populate the particular element based on a value in a corresponding element of the selected data source.

According to another implementation of the present disclosure, a method includes accessing, at a device, a permutation instruction. The method further includes accessing, at the device, a periodicity parameter of the permutation instruction. The periodicity parameter indicates a count of vector registers of a plurality of vector registers that contain source data for the permutation instruction. The method also includes executing the permutation instruction to, for each particular element of multiple elements of a first permutation result register of the plurality of vector registers, select a vector register of the plurality of vector registers based at least in part on the count of vector registers and populate the particular element based on a value in a corresponding element of the selected vector register.

According to another implementation of the present disclosure, a non-transitory computer-readable medium stores instructions that, when executed by a processor, cause the processor to access a periodicity parameter of a permutation instruction. The periodicity parameter indicates a count of vector registers of a plurality of vector registers that contain source data for the permutation instruction. The instructions, when executed by the processor, also cause the processor to execute the permutation instruction to, for each particular element of multiple elements of a first permutation result register of the plurality of vector registers, select a vector register of the plurality of vector registers based at least in part on the count of vector registers and populate the particular element based on a value in a corresponding element of the selected vector register.

According to another implementation of the present disclosure, an apparatus includes means for accessing a periodicity parameter of a permutation instruction. The periodicity parameter indicates a count of vector registers of a plurality of vector registers that contain source data for the permutation instruction. The apparatus also includes means for executing the permutation instruction to, for each particular element of multiple elements of a first permutation result register of the plurality of vector registers, select a vector register of the plurality of vector registers based at least in part on the count of vector registers and populate the particular element based on a value in a corresponding element of the selected vector register.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 7 is a diagram of an illustrative aspect of an example of execution of a rotation instruction prior to execution of a permutation instruction by the device of FIG. 1, in accordance with some examples of the present disclosure.

V. DETAILED DESCRIPTION

Figure 1:
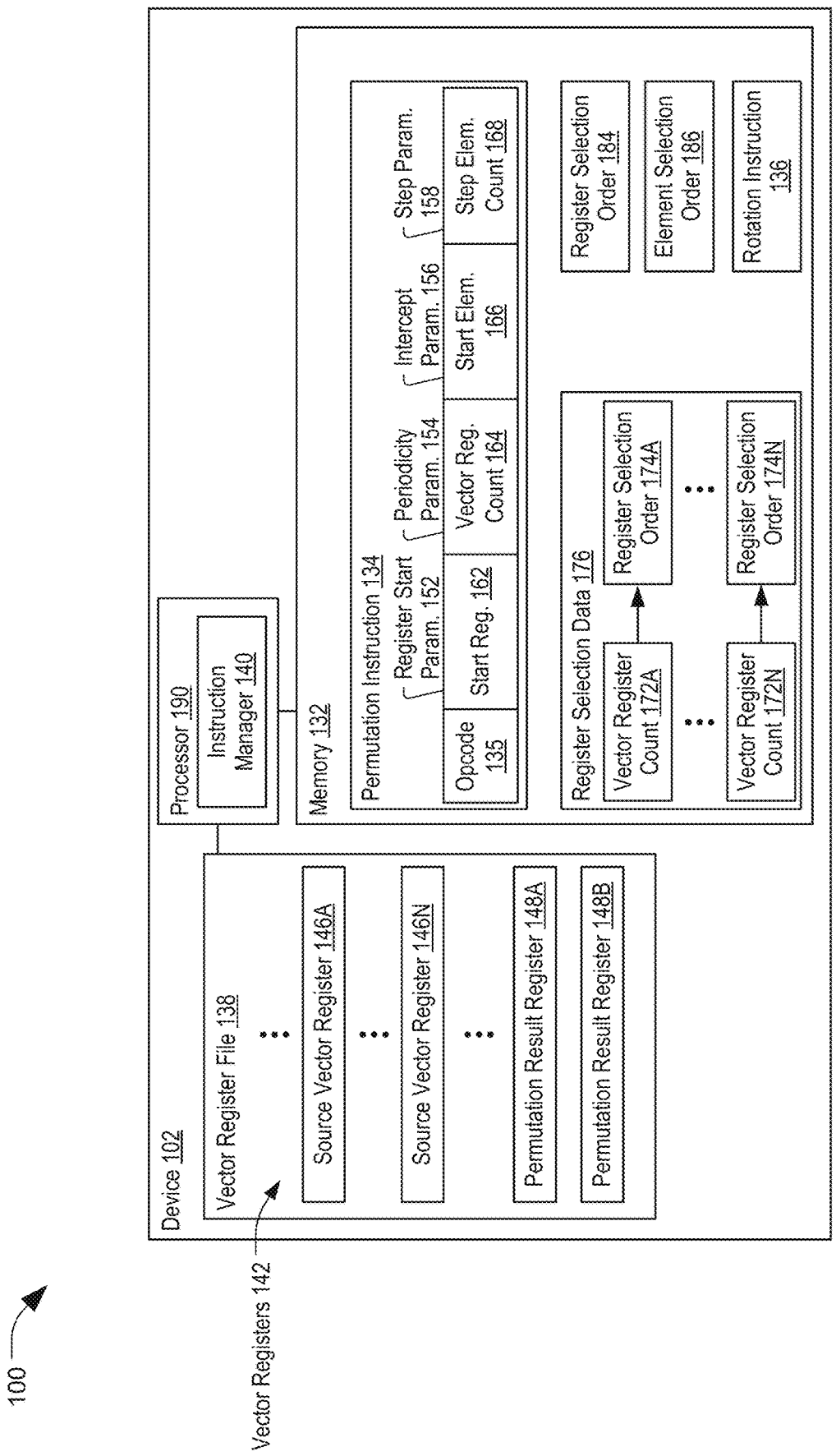
FIG. 1 is a block diagram of a particular illustrative aspect of a device operable to execute a permutation instruction, in accordance with some examples of the present disclosure.

Sequentially retrieving each of multiple data values, such as sensor data captured at various times, from memory and performing the same operation (e.g., filtering) on each retrieved data value can be time-consuming and can result in an unsatisfactory speed of execution of operations at a processor. Systems and methods of performing permutation instructions using vector registers are disclosed. In some systems, improved speed is obtained via use of vector registers (e.g., source vector registers) that can be used to load multiple data values from memory at the same time and an operation (e.g., a filtering operation) can be performed in parallel on the elements of the source vector registers. For example, every third data value of sensor data is to be selected (e.g., filtered) for subsequent processing. In a particular example, $0^{th}$-$31^{st}$ data values of the sensor data are loaded into a first source vector register, $32^{nd}$ to $63^{rd}$ data values of the sensor data are loaded into a second source vector register, and $64^{th}$-$95^{th}$ data values of the sensor data are loaded into a third source vector register.

In some circumstances, complexity associated with performing operations on the source data can be significantly reduced by filtering and re-ordering data values of the source data prior to performing computations on the data values, after performing computations on the data values, or both. Such filtering and re-ordering of the source data can be performed using a permutation instruction. For example, the permutation instruction can be performed during or in preparation of a downsampling operation, a matrix transpose, or a fast fourier kernel operation. A permutation instruction can be used, in conjunction with a register order vector register and an element order vector register, to copy selected elements from (e.g., copy data values from the selected elements of) the source vector registers to a first result vector register based on a register selection order indicated by the register order vector register, and to copy the elements from (e.g., copy data values from the elements of) the first result vector register to a second result vector register based on an element selection order indicated by the element order vector register.

In some aspects, each element of the register order vector register stores a value indicating a particular source vector register. In an example, the register order vector register stores the values 0, 1, 2, 0, 1, 2, 0, 1, 2, . . . such that each of the $0^{th}$, $3^{rd}$, $6^{th}$, etc. elements of the register order vector register store a value (e.g., 0) indicating the first source vector register, each of the $1^{st}$, $4^{th}$, $7^{th}$, etc. elements of the register order vector register store a value (e.g., 1) indicating the second source vector register, and each of the $2^{nd}$, $5^{th}$, $8^{th}$, etc. elements of the register order vector register store a value (e.g., 2) indicating the third source vector register. A data value stored in a corresponding element of the indicated source register is copied to a corresponding element of the first result vector register. For example, values stored in the $0^{th}$, the $1^{st}$, and the $2^{nd}$ elements of the register order vector register (e.g., 0, 1, 2, 0, 1, 2, 0, 1, 2, . . . ) indicate the first source vector register, the second source vector register, and the third source vector register, respectively. (Note that emphasis (bold and underlining) is applied to the values of some elements; such emphasis is provided solely to call the reader's attention to such elements and does not represent any particular property of such elements or any operation to be performed on such elements).

Based on the register order vector register, values stored in the $0^{th}$ element of the first source vector register (e.g., $0^{th}$ data value of the sensor data), the $1^{st}$ element of the second source vector register (e.g., $33^{rd}$ data value of the sensor data), and the $2^{nd}$ element of the third source vector register (e.g., the $66^{th}$ data value of the sensor data) are copied to $0^{th}$ element, the $1^{st}$ element, and the $2^{nd}$ element, respectively, of the first result vector register.

Similarly, values stored in the $3^{rd}$, the $4^{th}$, and the $5^{th}$ elements of the register order vector register (e.g., 0, 1, 2, 0, 1, 2, 0, 1, 2, . . . ) indicate the first source vector register, the second source vector register, and the third source vector register, respectively. Values stored in the $3^{rd}$ element of the first source vector register (e.g., $3^{rd}$ data value of the sensor data), the $4^{th}$ element of the second source vector register (e.g., $36^{th}$ data value of the sensor data), and the $5^{th}$ element of the third source vector register (e.g., the $69^{th}$ data value of the sensor data) are copied to $3^{rd}$ element, the $4^{th}$ element, and the $5^{th}$ element, respectively, of the first result vector register. In this manner, all data values of interest stored in the source vector registers are interleaved in the first result vector register. For example, the first result vector register includes the $0^{th}$, the $33^{rd}$, the $66^{th}$, the $3^{rd}$, the $36^{th}$, the $69^{th}$, and so on, data values of the sensor data.

Each element of the element order vector register indicates a particular index of the first result vector register. A data value is copied from an indicated element of the first result vector register to a corresponding element of the second result vector register. As an example. based on the element order vector register storing the values 0, 3, 6, 9, 12, 15, 18, 21, 24, 27, 1, 4, 7, 10, 13, 16, . . . , a value stored in the $0^{th}$ element of the first result vector register (e.g., the $0^{th}$ data value of sensor data) is copied to the $0^{th}$ element of the second result vector register, a value stored in the $3^{rd}$ element of the first result vector register (e.g., the $3^{rd}$ data value of sensor data) is copied to the $1^{st}$ element of the second result vector register, a value stored in the $6^{th}$ element of the first result vector register (e.g., the $6^{th}$ data value of sensor data) is copied to the $2^{nd}$ element of the second result vector register, and so on. For example, all of the data values of the first result vector register from the first source vector register are copied in order to the second result vector register. Similarly, all of the data values from the second source vector register followed by all of the data values from the third source vector register are copied in order from the first result vector register to the second result vector register. The second result vector register includes the data values of interest in order from earlier data values of the sensor data to later data values of the sensor data.

The data values stored in elements of the source vector registers can be copied to the first result vector register in parallel, and subsequently copied from the first result vector register to the second result vector register in parallel. Each of the register order vector register and the element order vector register includes as many elements as a source vector register.

A permutation instruction is disclosed that includes a periodicity parameter (e.g., a scalar parameter) that can be used in some cases to indicate the register selection order and the element selection order. A technical effect of using the scalar periodicity parameter to indicate the register selection order and the element selection order is to reduce memory usage, as compared to the above-described implementation in which a register order vector register and an element order vector register are used.

In some examples, the permutation instruction also includes a register start parameter. The register start parameter indicates a start source vector register (e.g., the first source vector register) to be used to populate an initial element of the first result vector register. The periodicity parameter indicates a count of source vector registers (e.g., 3 source vector registers) that contain source data (e.g., the sensor data).

In some examples, an instruction manager determines a register selection order based on the start source vector register (e.g., vector register 0) and the count of source vector registers (e.g., 3). For example, the register selection order begins from the start source vector register (e.g., vector register 0) and includes subsequent source vector registers until the count of source vector registers has been reached (e.g., vector register 1 and vector register 2), and then repeats, such as a register selection order of: 0, 1, 2, 0, 1, 2, 0, 1, 2, etc. The periodicity parameter can thus be used (instead of a register order vector register) to indicate a sequential and repetitive register selection order. In other examples, the instruction manager determines the register selection order based on register selection data that maps counts of source vector registers to register selection orders.

In some examples, the permutation instruction includes an intercept parameter, a step parameter, or both. The intercept parameter indicates a start element (e.g., $0^{th}$ element) of the first result vector register to be used to populate an initial element (e.g., $0^{th}$ element) of the second result vector register. The step parameter indicates a count of elements (e.g., 3 elements) to be included in a step (also referred to as a "step size") to a next element of the first result vector register to be used to populate a subsequent element of the second result vector register. The step wraps around upon reaching an end of the first result vector register until the elements of the second result vector register have been populated.

The instruction manager determines an element selection order based on the start element (e.g., element 0) and the count of elements to be included in each step (e.g., 3 elements). For example, the element selection order begins from the start element (e.g., element 0) and includes subsequent elements in each step (e.g., 0, 3, 6, 9, 12, 15, 18, 21, 24, 27, 30, 1, 4, 7, 10, 13, 16, . . . ). The intercept parameter, the step parameter, or both, can thus be used (instead of an element order vector register) to indicate a uniformly stepped element selection order.

In some aspects, each of the register start parameter, the periodicity parameter, the intercept parameter, and the step parameter corresponds to a scalar value that can be stored in a scalar register. Storing up to two scalar values (e.g., the start parameter, the periodicity parameter, or both) to indicate the register selection order uses less memory than using a vector register (e.g., the register order vector register) that can store a much larger count (e.g., 32) of scalar values. Similarly, storing up to two scalar values (e.g., the intercept parameter, the step parameter, or both) to indicate the element selection order uses less memory than using a vector register (e.g., the element order vector register) that can store a much larger count (e.g., 32) scalar values.

Figure 11:
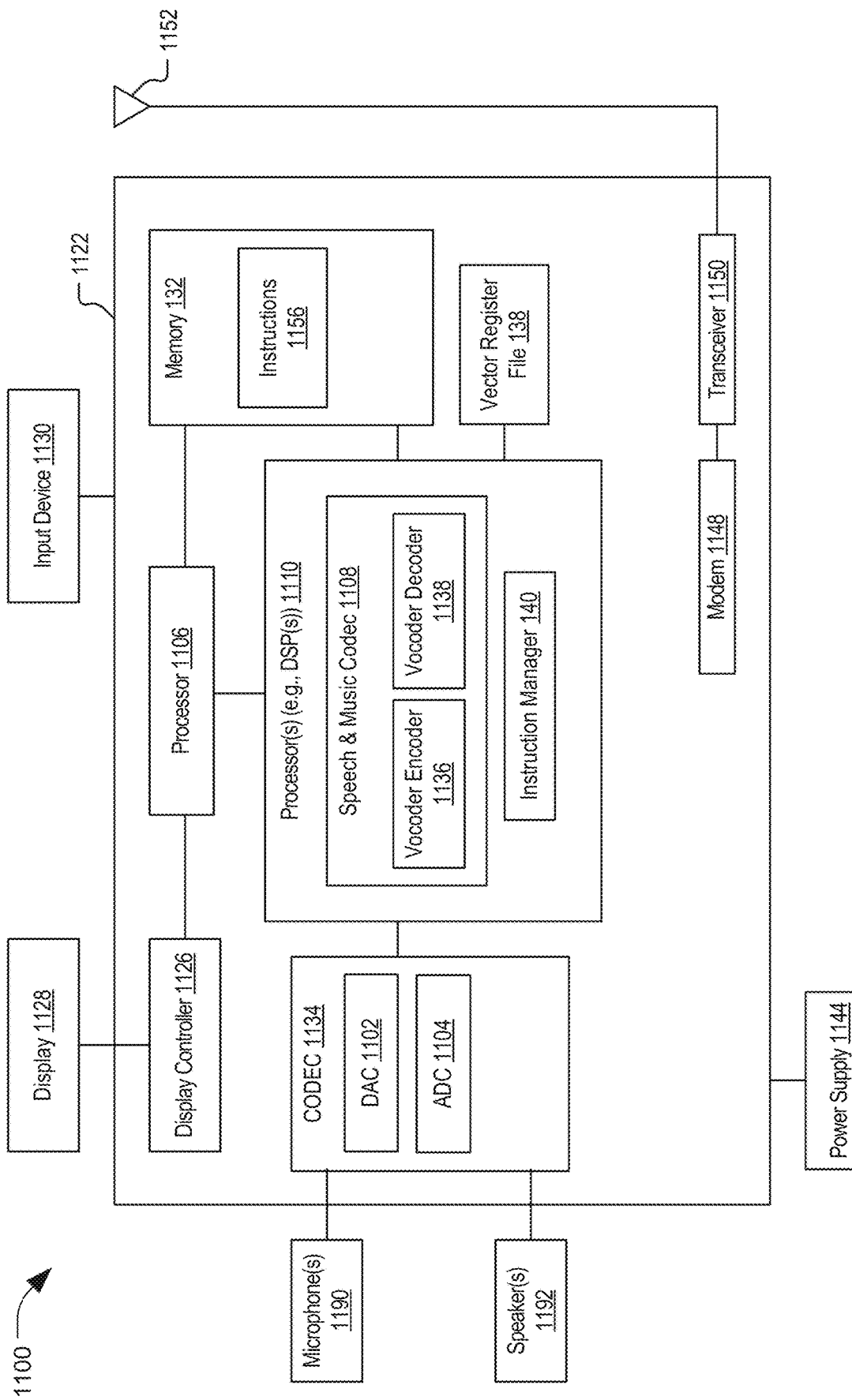
FIG. 11 is a block diagram of a particular illustrative example of a device that is operable to execute a permutation instruction, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 11 depicts a device 1100 including one or more microphones ("microphone(s)" 1190 of FIG. 11), which indicates that in some implementations the device 1100 includes a single microphone 1190 and in other implementations the device 1100 includes multiple microphones 1190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a diagram 100 of a particular illustrative aspect of a device 102 is shown. The device 102 includes a processor 190 coupled to a memory 132. In a particular aspect, the memory 132 is configured to store a permutation instruction 134. In some implementations, the permutation instruction 134 may be added to an instruction set architecture (ISA). In some implementations, the processor 190 corresponds to a vector processor that implements the ISA. For example, the processor 190 is configured to efficiently operate on vectors. In a particular aspect, the processor 190 is configured to efficiently copy a vector (e.g., a large one-dimensional array of data) from the memory 132 to a vector register, and vice versa, and to perform parallel processing of multiple data values from a vector register, such as using multiple parallel computation lanes, in a single instruction multiple data (SIMD) configuration.

The device 102 also includes a vector register file 138 coupled to the processor 190. In some implementations, the vector register file 138 is integrated in the processor 190. The vector register file 138 includes a plurality of vector registers 142. In some examples, each vector register of the plurality of vector registers 142 includes the same count of elements (e.g., each vector register is sized to include 32 elements to hold 32 data values). Although each of the plurality of vector registers 142 is described in examples herein as including 32 elements, in other examples one or more of the plurality of vector registers 142 can include fewer than 32 elements or more than 32 elements.

The plurality of vector registers 142 includes a plurality of source vector registers 146 configured to store source data (e.g., retrieved from the memory 132 or received from another device) to be processed by the permutation instruction 134. In a particular aspect, the plurality of source vector registers 146 includes a source vector register 146A and one or more additional source vector registers 146 including a source vector register 146N.

The plurality of vector registers 142 includes a plurality of permutation result registers 148 configured to store an intermediate result or a final result of execution of the permutation instruction 134. For example, a permutation result register 148A of the plurality of permutation result registers 148 is configured to store an intermediate result of the permutation instruction 134, and a permutation result register 148B of the plurality of permutation result registers 148 is configured to store a final result of the permutation instruction 134. The plurality of permutation result registers 148 including two vector registers is provided as an illustrative example; in other examples the plurality of permutation result registers 148 can include more than two vector registers.

The permutation instruction 134 includes an opcode 135 and one or more of a register start parameter 152, a periodicity parameter 154, an intercept parameter 156, or a step parameter 158. The opcode 135 (e.g., an operation code) corresponds to an identifier of the permutation instruction 134. The register start parameter 152 is configured to indicate that one (e.g., the source vector register 146A) of the plurality of source vector registers 146 is designated as a start register 162. The start register 162 (e.g., the source vector register 146A) is to be used to populate an initial element of a permutation result register 148A. For example, the register start parameter 152 indicates an index of a source vector register 146 (e.g., the source vector register 146A) that is designated as the start register 162. The periodicity parameter 154 is configured to indicate a count (e.g., a vector register count 164) of source vector registers 146 of the plurality of vector registers 142 that contain source data (e.g., sensor data) to be processed by the permutation instruction 134.

The intercept parameter 156 is configured to indicate that one element of the permutation result register 148A is designated as a start element 166. The start element 166 is to be used to populate an initial element (e.g., a $0^{th}$ element) of the permutation result register 148B. For example, the intercept parameter 156 indicates an index of an element of the permutation result register 148A that is designated as the start element 166. The step parameter 158 is configured to indicate a step element count 168 corresponding to a count of elements of the permutation result register 148A to be included in a step to a next element of the permutation result register 148A to be used to populate a subsequent element of the permutation result register 148B.

The memory 132 is configured to store register selection data 176 that maps a plurality of vector register counts 172 to a plurality of register selection orders 174, as further described with reference to FIG. 5. For example, a vector register count 172A maps to a register selection order 174A, one or more additional vector register counts 172 map to one or more additional register selection orders, a vector register count 172N maps to a register selection order 174N, or a combination thereof. In a particular implementation, any vector register of the vector register file 138 can be used as a source vector register, and the register selection data 176 can include mappings for any number of vector register counts to register selection orders. The number (e.g., count) of mappings included in the register selection data 176 may or may not match the number (e.g., count) of source vector registers in the vector register file 138. For example, the "N" for source vector register 146N may refer to the same number or a different number as the "N" for vector register count 172N. In an illustrative example, the vector register count 164 indicates that three vector registers of the vector register file 138 are to be used as source vector registers and the register selection data 176 includes mappings for an infinite number of vector register counts. To illustrate, the register selection data 176 includes mappings for specific vector register counts, such as for 1, 2, 3, 4, 5, 8, etc., as well as a mapping for "any other" vector register count. Three source vector registers and mappings for an infinite number of vector register counts are provided as an illustrative example, in other examples any number of vector registers of the vector register file 138 may be used as source vector registers and the register selection data 176 may include mappings for any number of vector register counts.

The processor 190 includes an instruction manager 140 that is configured to execute the permutation instruction 134. In a particular aspect, the instruction manager 140 is configured to perform one or more of fetching the permutation instruction 134, decoding the permutation instruction 134 to determine the start register 162, the vector register count 164, the start element 166, the step element count 168, or a combination thereof, loading the plurality of source vector registers 146 with source data for the permutation instruction 134 from the memory 132 or another device, executing the permutation instruction 134 based on the start register 162, the vector register count 164, the start element 166, the step element count 168, or a combination thereof, or outputting a result from the permutation result register 148B to the memory 132 or another device.

The instruction manager 140 is configured to copy a value from a single element of the source vector registers 146 corresponding to a particular element index to the permutation result register 148A. In other words, values from elements of multiple source vector registers that correspond to the same element index are not copied to the permutation result register 148A. To illustrate, in some implementations the source vector registers 146 are aligned such that a first "column" of source data is formed by the values stored in the $0^{th}$ elements of the source vector registers 146, a second column of source data is formed by the values stored in the $1^{st}$ elements of the source vector registers 146, etc. Each column of source data can include a single data value of interest for execution of the permutation instruction 134.

In some cases, multiple source vector registers include "values of interest" (e.g., values that are to be included in a result) in elements corresponding to the same index (e.g., "0"). For example, multiple values of interest are included in the same "column" of source data. To illustrate, a first data value of interest is included in an element (e.g., $0^{th}$ element) of the source vector register 146A that corresponds to a particular index (e.g., '0'), and an Nth data value of interest is included in an element (e.g., $0^{th}$ element) of the source vector register 146N that corresponds to the particular index (e.g., "0").

In some implementations, the instruction manager 140 is configured to pre-process values of the source data stored in the plurality of source vector registers 146 prior to execution of the permutation instruction 134. Pre-processing can include changing positions of values of the source data stored in the plurality of source vector registers 146 such that each data value of interest is stored in an element corresponding to a different index. For example, the instruction manager 140 is configured to execute a rotation instruction 136 to rotate positions of values stored in one or more of the plurality of source vector registers 146 prior to execution of the permutation instruction 134, as further described with reference to FIG. 7. To illustrate, subsequent to executing the rotation instruction 136, the Nth data value of interest is stored in an element (e.g., Nth element) of the source vector register 146N that corresponds to an index (e.g., "N") that is distinct from an index of elements of the plurality of source vector register 146 that store the remaining values of interest.

The instruction manager 140 can, during performance of the permutation instruction 134, copy each of the values of interest from an element of the source vector registers 146 that corresponds to a distinct index. In some implementations, the rotation instruction 136 and the permutation instruction 134 are stored in an instruction queue. The instruction manager 140, in response to determining that a position of the rotation instruction 136 relative to the position of the permutation instruction 134 in the instruction queue indicates that the rotation instruction 136 is to be performed prior to performance of the permutation instruction 134, performs the rotation instruction 136 prior to performing the permutation instruction 134.

Executing the permutation instruction 134 includes determining a register selection order 184 based on the start register 162 (e.g., indicated by the register start parameter 152), the vector register count 164 (e.g., indicated by the periodicity parameter 154), the register selection data 176, or a combination thereof, and copying data values from elements of the plurality of source vector registers 146 to elements of the permutation result register 148A based on the register selection order 184. Executing the permutation instruction 134 also includes determining an element selection order 186 based on the start element 166 (e.g., indicated by the intercept parameter 156), the step element count 168 (e.g., indicated by the step parameter 158), or both, and copying data values from elements of the permutation result register 148A to elements of the permutation result register 148B based on the element selection order 186.

In some implementations, the device 102 corresponds to or is included in one of various types of devices. In an illustrative example, one or more components of the device 102 (e.g., the processor 190, the memory 132, the vector register file 138, or a combination thereof) are integrated in at least one of a headset device, a mobile phone, a tablet computer device, a wearable electronic device, a voice-controlled speaker system, a camera device, a virtual reality headset, a mixed reality headset, an augmented reality headset, or a vehicle.

During operation, the instruction manager 140 determines the start register 162. In some examples, the permutation instruction 134 includes the register start parameter 152, and the instruction manager 140 accesses the register start parameter 152 to determine the start register 162. To illustrate, the instruction manager 140, in response to determining that the register start parameter 152 indicates a first source register index (e.g., 0) of the source vector register 146A, determines that the register start parameter 152 indicates that the source vector register 146A is designated as the start register 162. In other examples, the register start parameter 152 is absent from the permutation instruction 134 and the instruction manager 140, in response to determining that the register start parameter 152 is absent from the permutation instruction 134, determines that a default vector register (e.g., the source vector register 146A) corresponding to a default source register index (e.g., 0) is to be used as the start register 162. The start register 162 is to be used to populate an initial element (e.g., a $0^{th}$ element) of the permutation result register 148A.

The instruction manager 140 determines the vector register count 164. For example, the instruction manager 140 accesses the periodicity parameter 154 of the permutation instruction 134 to determine the vector register count 164 of the plurality of source vector registers 146 that store source data for the permutation instruction 134.

The instruction manager 140 determines the start element 166. In a particular aspect, each of the plurality of vector registers 142 includes a plurality of elements (e.g., 32 elements). Each element of a vector register 142 has (e.g., is identifiable based on) an element index (e.g., a value between 0 and 31). In some examples, the permutation instruction 134 includes the intercept parameter 156, and the instruction manager 140 accesses the intercept parameter 156 to determine the start element 166. To illustrate, the instruction manager 140, in response to determining that the intercept parameter 156 includes a particular element index (e.g., 0), determines that the intercept parameter 156 indicates that a particular element of the permutation result register 148A having the particular element index is designated as the start element 166. In other examples, the intercept parameter 156 is absent from the permutation instruction 134, and the instruction manager 140, in response to determining that the intercept parameter 156 is absent from the permutation instruction 134, determines that a default element of the permutation result register 148A (e.g., the $0^{th}$ element) corresponding to a default element index (e.g., 0) is to be used as the start element 166. The start element 166 is to be used to populate an initial element (e.g., a $0^{th}$ element) of the permutation result register 148B.

The instruction manager 140 determines the step element count 168. In some examples, the permutation instruction 134 includes the step parameter 158, and the instruction manager 140 accesses the step parameter 158 to determine the step element count 168. The step element count 168 indicates a count of elements to be included in a step to a next element of the permutation result register 148A to be used to populate a subsequent element of the permutation result register 148B. For example, if the start register 162 corresponds to a $0^{th}$ element of the permutation result register 148A to populate a $0^{th}$ element of the permutation result register 148B, the next element of the permutation result register 148A corresponds to the $0^{th}$+step element count 168 element of the permutation result register 148A to populate the $1^{st}$ element of the permutation result register 148B. In some implementations, the periodicity parameter 154 and the step parameter 158 are overloaded. For example, a single value indicated by the permutation instruction 134 corresponds to both the periodicity parameter 154 and the step parameter 158. To illustrate, the step parameter 158 has the same value as the periodicity parameter 154. In some implementations, the permutation instruction 134, in response to determining that the step parameter 158 is absent from the permutation instruction 134, determines the step element count 168 based on the periodicity parameter 154. In a particular example, the step element count 168 is based on (e.g., is the same as) the vector register count 164.

In some aspects, the step element count 168 having the same value as the vector register count 164 corresponds to copying all values of a particular source vector register 146 that are stored in the permutation result register 148A to a set of consecutive elements of the permutation result register 148B, as further described with reference to FIGS. 2, 4, and 6. To illustrate, values stored in the permutation result register 148B correspond to a permutation of the values stored in the permutation result register 148A. In some aspects, the step element count 168 having a different value than the vector register count 164 corresponds to at least some elements copied from a particular source vector 146 stored in non-consecutive elements of the permutation result register 148B, as further described with reference to FIGS. 8-9. In some examples, a step element count 168 having a particular value (e.g., 1) corresponds to copying the elements from the permutation result register 148A to the permutation result register 148B without permutation, as further described with reference to FIG. 8.

The instruction manager 140 determines, based on the register selection data 176, a register selection order 184 corresponding to the vector register count 164, as further described with reference to FIG. 5. The register selection order 184 indicates register indices for elements of the permutation result register 148A. For example, a register index for an element "i" of the permutation result register 148A is given by the register selection order 184 in terms of the start register 162 (e.g., as indicated by the register start parameter 152), the vector register count 164 (e.g., as indicated by the periodicity parameter 154), or both, as further described with reference to FIG. 2. The register selection order 184 indicates a particular source vector register 146 corresponding to each element of the permutation result register 148A.

The instruction manager 140 determines the element selection order 186 based on the start element 166 and the step element count 168. The element selection order 186 indicates the start element 166 of the permutation result register 148A and next elements of the permutation result register 148A that correspond to the step element count 168 added to the previous indicated element of the permutation result register 148A. The element selection order 186 wraps around after reaching the end of the elements of the permutation result register 148A until each element of the permutation result register 148A is indicated by the element selection order 186, as further described with reference to FIG. 2. For example, the element selection order 186 indicates element indices for elements of the permutation result register 148B in which "i" corresponds to an index of an element of the permutation result register 148B and an element index for an element i of the permutation result register 148B is given in terms of the start element 166 (e.g., as indicated by the intercept parameter 156), the step element count 168 (e.g., as indicated by the step parameter 158), or both, as described with reference to FIG. 2. The element selection order 186 indicates a particular element index corresponding to each element of the permutation result register 148B.

The instruction manager 140 executes the permutation instruction 134 to populate the permutation result register 148A based on the register selection order 184, as further described with reference to FIG. 2. For example, the instruction manager 140, for each particular element of the permutation result register 148A, selects, based on the register selection order 184, a source vector register of the plurality of source vector registers 146, and populates the particular element based on a corresponding element of the source vector register, as further described with reference to FIG. 2.

The instruction manager 140, during execution of the permutation instruction 134, populates elements of the permutation result register 148B based on the element selection order 186, as further described with reference to FIG. 2. For example, the instruction manager 140 selects, for a particular element (e.g., i) of the permutation result register 148B and based on the element selection order 186, an element of the permutation result register 148A, and populates the particular element of the permutation result register 148B based on the selected element of the permutation result register 148A, as further described with reference to FIG. 2.

The permutation instruction 134 enables operations to be performed on the source data without using vector registers to specify the register selection order 184 and the element selection order 186. In a particular aspect, the instruction manager 140 loads the source data from the memory 132 (or another device) in parallel to one or more of the plurality of source vector registers 146. In some implementations, the instruction manager 140, during execution of the permutation instruction 134, populates the elements of the permutation result register 148A in parallel based on the elements of the plurality of source vector registers 146, and populates the elements of the permutation result register 148B in parallel based on a permutation of the values of the elements of the permutation result register 148A.

The permutation instruction 134 copying data from the source vector registers 146 to populate the permutation result registers 148 is provided as an illustrative examples. In some implementations, the permutation instruction 134 can be used to perform similar operations (as described with copying data from the source vector registers 146) to copy data from a plurality of data sources to populate the permutation result registers 148. For example, a start parameter (similar to the register start parameter 152) indicates a start data source, the periodicity parameter 154 indicates a data source count, or both. The instruction manager 140 has access to selection data (e.g., similar to the register selection data 176) that maps data source counts to selection orders. A selection order indicates an order of selection of the data sources to populate the permutation result register 148A. A data source can include a source vector register 146, another component of the device 102, another device, another system, or a combination thereof.

Figure 2:
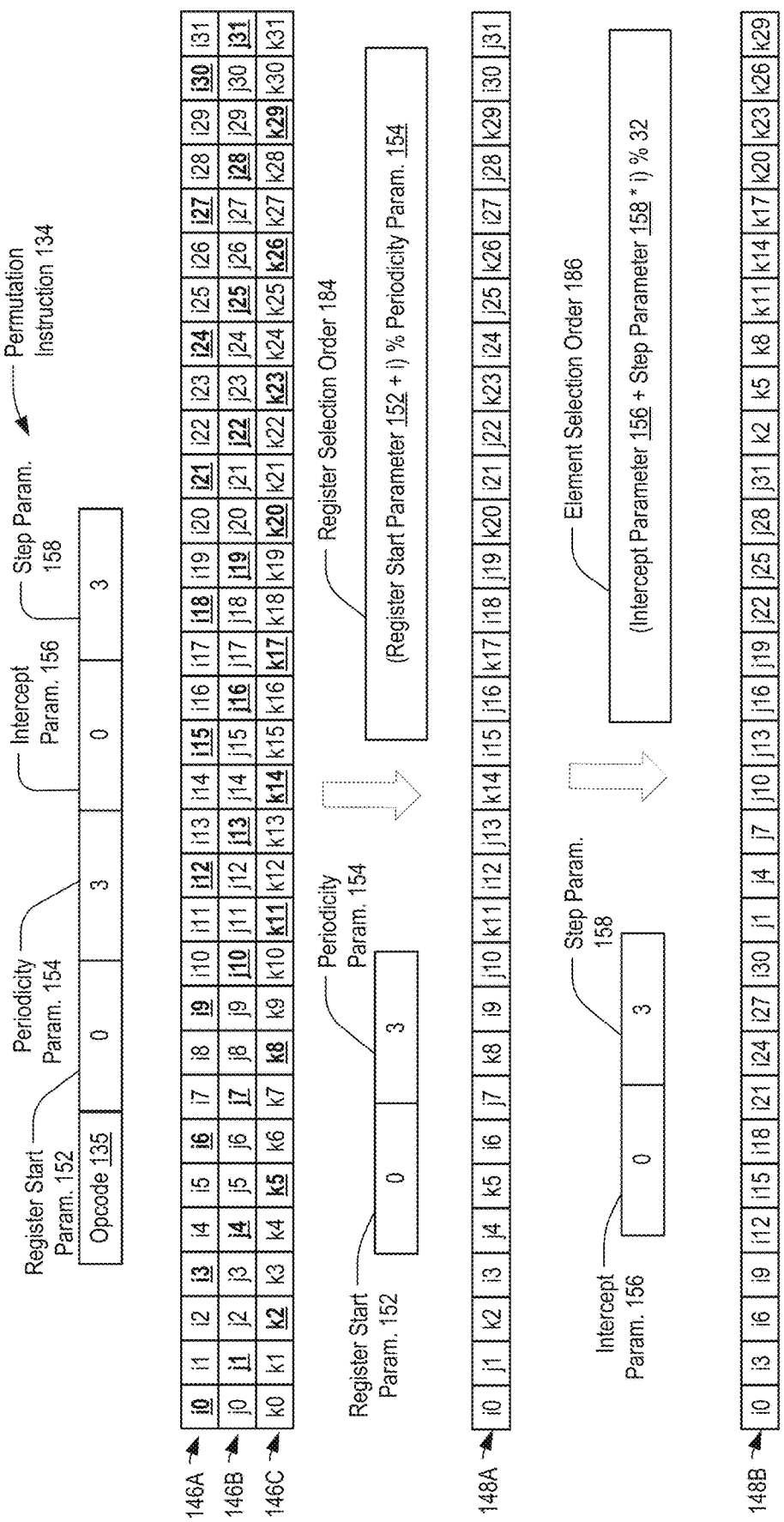
FIG. 2 is a diagram of an illustrative aspect of an example of execution of a permutation instruction by the device of FIG. 1, in accordance with some examples of the present disclosure.

Referring to FIG. 2, an example 200 of execution of the permutation instruction 134 is shown. For example, the instruction manager 140 of FIG. 1 executes the permutation instruction 134 for source data stored in source vector registers 146A-C. Executing the permutation instruction 134 includes populating the permutation result register 148A based on the start register 162 (e.g., indicated by the register start parameter 152) and the vector register count 164 (e.g., indicated by the periodicity parameter 154), followed by populating the permutation result register 148B based on start element 166 (e.g., indicated by the intercept parameter 156) and the step element count 168 (e.g., indicated by the step parameter 158), as described in more detail below.

In the example 200, the source vector register 146A, a source vector register 146B, and a source vector register 146C store data values i0-i31, j0-j31, and k0-k31, respectively. The source vector register 146A, the source vector register 146B, and the source vector register 146C correspond to (e.g., are uniquely identifiable based on) a first source register index (e.g., 0), a second source register index (e.g., 1), and a third source register index (e.g., 2), respectively. The periodicity parameter 154 indicates a vector register count 164 of 3. For example, the periodicity parameter 154 indicates that three source vector registers store source data for the permutation instruction 134. Although three source vector registers storing the source data are provided as an illustrative non-limiting example, in other examples fewer than three or more than three source vector registers can store the source data for the permutation instruction 134.

The instruction manager 140 determines, based on the register selection data 176, a register selection order 184 corresponding to the vector register count 164, as further described with reference to FIG. 5. The register selection order 184 indicates register indices for elements of the permutation result register 148A in which "i" corresponds to an index of an element of the permutation result register 148A and a register index for an element i of the permutation result register 148A is given by: ((the register start parameter 152+i) % 3) that corresponds to a vector register count 164 of 3, where "%" corresponds to the modulus operator.

In the example 200, the register start parameter 152 has a value of 0 indicating a start register 162 corresponding to a register index of 0. The register selection order 184 indicates a particular source vector register 146 corresponding to each element of the permutation result register 148A. In some examples, the register selection order 184 (e.g., 0, 1, 2, 0, 1, 2, 0, 1, 2, . . . ) begins from the start register 162, indicates each successive source vector register of the plurality of source vector registers 146 until the vector register count 164 (e.g., 3 source vector registers) is met, and repeats. In other examples, the register selection order 184 (e.g., 0, 2, 4, 1, 3, 0, 2, 4, 1, 3, . . . ) begins from the start register 162, and includes a repeated, out-of-order sequence of the plurality of source vector registers 146 corresponding to the vector register count 164 (e.g., 5 source vector registers), as further described with reference to FIG. 6.

In some examples, the instruction manager 140 calculates values (e.g., 0, 1, 2, 0, 1, 2, 0, 1, 2, 0, 1, 2, 0, 1, 2, 0, 1, 2, 0, 1, 2, 0, 1, 2, 0, 1, 2, 0, 1, 2, 0, 1) of the register selection order 184 corresponding to each element of the permutation result register 148A and stores the values of the register selection order 184 in a register order vector register. In these examples, the elements of the permutation result register 148A can be populated in parallel based on the values of the register selection order 184 stored in the register order vector register. In other examples, the instruction manager 140 stores the register selection order 184 (e.g., i % 3) as a formula or a function that can be used to determine a corresponding source vector register one at a time for each element of the permutation result register 148A and store one value of the register selection order 184 at a time as a scalar value. In these examples, elements of the permutation result register 148A can be populated sequentially one element at a time based on the stored scalar value of the register selection order 184.

In the example 200, the intercept parameter 156 has a value of 0 indicating a start element 166 of 0 and the step parameter 158 has a value of 3 indicating a step element count 168 of 3. The instruction manager 140 determines the element selection order 186 based on the start element 166 (indicated by the intercept parameter 156) and the step element count 168 (indicated by the step parameter 158). For example, the element selection order 186 indicates element indices for elements of the permutation result register 148B in which "i" corresponds to an index of an element of the permutation result register 148B and an element index for an element i of the permutation result register 148B is given by: ((the intercept parameter 156+the step parameter 158*i) % 32) or (3i % 32).

The element selection order 186 indicates a particular element index corresponding to each element of the permutation result register 148B. In some examples, the element selection order 186 (e.g., 0, 3, 6, 9, 12, 15, 18, 21, 24, 27, 30, 1, 4, 7, 10, 13, 16, 19, 22, 25, 28, 31, 2, 5, 8, 11, 14, 17, 20, 23, 26, 29) begins from the start element 166 (e.g., 0), followed by multiples of 3 until the 30$^{th}$ element of the permutation result register 148A, and wraps around to continue stepping through the elements of the permutation result register 148A based on the step element count 168.

In some examples, the instruction manager 140 calculates values (e.g., 0, 3, 6, 9, 12, 15, 18, 21, 24, 27, 30, 1, 4, 7, 10, 13, 16, 18, 22, 25, 28, 31, 2, 5, 8, 11, 14, 17, 19, 23, 26, 29) of the element selection order 186 corresponding to each element of the permutation result register 148B and stores the values of the element selection order 186 in an element order vector register. In these examples, the elements of the permutation result register 148B can be populated in parallel based on the values of the element selection order 186 stored in the element order vector register. In other examples, the instruction manager 140 stores the element selection order 186 (e.g., 3i % 32) as a formula or a function that can be used to determine a corresponding element of the permutation result register 148A one at a time for each element of the permutation result register 148B and store one value of the element selection order 186 at a time as a scalar value. In these examples, elements of the permutation result register 148B can be populated sequentially one at a time based on the stored scalar value of the element selection order 186.

The instruction manager 140 executes the permutation instruction 134 to populate the permutation result register 148A based on the register selection order 184. For example, the instruction manager 140, for each particular element of the permutation result register 148A, selects, based on the register selection order 184 (e.g., i %3), a source vector register of the plurality of source vector registers 146, and populates the particular element based on a corresponding element of the source vector register. To illustrate, the instruction manager 140 determines that the register selection order 184 indicates that a particular register index (e.g., i % 3) corresponds to a particular element (e.g., having an index i) of the permutation result register 148A. The instruction manager 140 selects a source vector register 146 associated with the particular register index (e.g., i % 3) and copies a value from a corresponding element (e.g., having the index i) of the selected source vector register 146 to the particular element (e.g., having the index i) of the permutation result register 148A.

In the example 200, the instruction manager 140 determines that the register selection order 184 indicates that a first register index (e.g., 0) corresponds to a 0$^{th}$ element of the permutation result register 148A (e.g., i=0, i % 3=0%3=0). The instruction manager 140 selects the source vector register 146A having the first register index (e.g., 0) and copies a data value (e.g., i0) from the $0^{th}$ element of the source vector register 146A to the $0^{th}$ element of the permutation result register 148A. As another example, the instruction manager 140 determines that the register selection order 184 indicates that a second register index (e.g., 1) corresponds to a $1^{st}$ element of the permutation result register 148A (e.g., i=1, i %3=1). The instruction manager 140 selects the source vector register 146B having the second register index (e.g., 1) and copies a data value (e.g., j1) from the $1^{st}$ element of the source vector register 146B to the $1^{st}$ element of the permutation result register 148A. Similarly, the instruction manager 140 copies a data value (e.g., k2) from the $2^{nd}$ element of the source vector register 146C having a third register index (e.g., 2%3=2) to the $2^{nd}$ element of the permutation result register 148A. The instruction manager 140 copies a data value (e.g., i3) from the $3^{rd}$ element of the source vector register 146A having the first register index (e.g., 3%3=0) to the $3^{rd}$ element of the permutation result register 148A, and so on until all the elements of the permutation result register 148A are populated. Although described in terms of sequentially populating each element of the permutation result register 148A for ease of understanding, it should be understood that in some implementations some or all data values may be copied from the source vector registers 146A-C into the permutation result register 148A in parallel, rather than sequentially.

The instruction manager 140, during execution of the permutation instruction 134, populates elements of the permutation result register 148B based on the element selection order 186. In some aspects, the element selection order 186 corresponds to a permutation of data values stored in the elements of permutation result register 148A. For example, the instruction manager 140 selects, for a particular element (e.g., i) of the permutation result register 148B and based on the element selection order 186, an element (e.g., 3i %32) of the permutation result register 148A, and populates the particular element of the permutation result register 148B based on the selected element of the permutation result register 148A. To illustrate, the instruction manager 140 determines that the element selection order 186 indicates that a particular element index (e.g., 3i %32) corresponds to a particular element (e.g., having an index i) of the permutation result register 148B. The instruction manager 140 selects a particular element of the permutation result register 148A associated with the particular element index (e.g., 3i %32) and copies a data value from the selected element (e.g., having the index 3i %32) of the permutation result register 148A to the particular element (e.g., having the index i) of the permutation result register 148B.

The instruction manager 140 determines that the element selection order 186 (e.g., i=0, 3i %32=0%32=0) indicates that a first element index (e.g., 0) corresponds to a $0^{th}$ element of the permutation result register 148B. The instruction manager 140 selects the $0^{th}$ element of the permutation result register 148A having the first element index (e.g., 0) and copies a data value (e.g., i0) from the $0^{th}$ element of the permutation result register 148A to the $0^{th}$ element of the permutation result register 148B. As another example, the instruction manager 140 determines that the element selection order 186 (e.g., i=1, 3i %32=3%32=3) indicates that a second register index (e.g., 3) corresponds to a $1^{st}$ element of the permutation result register 148B. The instruction manager 140 selects the $3^{rd}$ element of the permutation result register 148A having the second register index (e.g., 3) and copies a data value (e.g., i3) from the $3^{rd}$ element of the permutation result register 148A to the $1^{st}$ element of the permutation result register 148B, and so on until all the elements of the permutation result register 148B are populated. Although described in terms of sequentially populating each element of the permutation result register 148B for ease of understanding, it should be understood that in some implementations some or all data values may be copied from the permutation result register 148A to the permutation result register 148B in parallel, rather than sequentially. The permutation result register 148B thus includes filtered data values (e.g., every third source data value) in order.

In the example 200, the register start parameter 152 (e.g., 0), the periodicity parameter 154 (e.g., 3), the intercept parameter 156 (e.g., 0), and the step parameter 158 (e.g., 3) correspond to performing a filtering operation on the source data, such as selecting x[3n], where "x" corresponds to source data and "n" is an integer greater than or equal to 0. For example, selecting x[3n] corresponds to selecting x[0], x[3], x[6], etc., or selecting every third source data value starting with the $0^{th}$ data value to populate the permutation result register 148B. In an illustrative example, resultdata[n]=x[3n] for integer n>=0, where "resultdata" corresponds to the permutation result register 148B (e.g., the final result). A particular element "n" of the permutation result register 148B is to store data value having an index "3n" in the source data. For example, resultdata[0]=x[0], resultdata[1]=x[3], resultdata[2]=x[6], etc.

Although the register selection order 184 is described as based on the register start parameter 152 and the periodicity parameter 154 (e.g., register selection order 184=(register start parameter 152+i) % (periodicity parameter 154)) as an illustrative example, in a more general example the register selection order 184 can be described as based on the start register 162 and the vector register count 164, such as: register selection order 184=(start register 162+i) % (vector register count 164). Similarly, although the element selection order 186 is described as based on the intercept parameter 156 and the step parameter 158 (e.g., element selection order 186=(intercept parameter 156+step parameter 158*i) % 32), in a more general example the element selection order 186 can be described as based on the start element 166 and the step element count 168, such as: element selection order 186=(start element 166+the step element count 168*i) % 32.

The permutation instruction 134 enables operations to be performed on the source data without using vector registers to specify the register selection order 184 and the element selection order 186. In a particular aspect, the instruction manager 140 loads the source data from the memory 132 (or another device) in parallel to one or more of the plurality of source vector registers 146. In some implementations, the instruction manager 140, during execution of the permutation instruction 134, populates the elements of the permutation result register 148A in parallel based on the elements of the plurality of source vector registers 146, and populates the elements of the permutation result register 148B in parallel based on a permutation of the values of the elements of the permutation result register 148A.

In some implementations, the instruction manager 140, during execution of the permutation instruction 134, populates elements of the permutation result register 148A serially based on the elements of the plurality of source vector registers 146. For example, the instruction manager 140, during execution of the permutation instruction 134, selects the source vector register 146A based on the register selection order 184 and populates a first element of the permutation result register 148A based on the source vector register 146A. The instruction manager 140, subsequent to populating the first element of the permutation result register 148A, selects the source vector register 146B based on the register selection order 184 and populates a second element of the permutation result register 148A based on the source vector register 146B, and so on. In these implementations, a source vector register indicated by the register selection order 184 (e.g., a function or a formula) as corresponding to a next element of the permutation result register 148A can be determined one at a time to select the next source vector register. An index of the next selected source vector register can be stored as a scalar value (e.g., indicating one of 0, 1, or 2) instead of storing indices of each source vector register corresponding to each element of the permutation result register 148A using a vector register (e.g., indicating 32 values, such as 0, 1, 2, 0, 1, 2, 0, 1, 2, . . . ).

In some implementations, the instruction manager 140, during execution of the permutation instruction 134, populates elements of the permutation result register 148B serially based on a permutation of the values of the elements of the permutation result register 148A. For example, the instruction manager 140, during execution of the permutation instruction 134, selects a first element (e.g., the $0^{th}$ element) of the permutation result register 148A based on the element selection order 186 and copies a value (e.g., i0) from the first element of the permutation result register 148A to a first element (e.g., the $0^{th}$ element) of the permutation result register 148B. The instruction manager 140, subsequent to populating the first element of the permutation result register 148B, selects a second element (e.g., the $3^{rd}$ element) of the permutation result register 148A based on the element selection order 186 and copies a value (e.g., i3) from the second element (e.g., the $3^{rd}$ element) of the permutation result register 148A to a second element (e.g., the $1^{st}$ element) of the permutation result register 148B, and so on. In these implementations, a next element index indicated by the element selection order 186 (e.g., a function or a formula) as corresponding to a next element of the permutation result register 148B can be determined one at a time to select the next element of the permutation result register 148A. An index of the next selected element can be stored as a scalar value (e.g., indicating one of 0 to 31) instead of storing indices of each element of the permutation result register 148A corresponding to each element of the permutation result register 148B using a vector register (e.g., indicating 32 values, such as 0, 3, 6, 9, 12, 15, 18, 21, 24, . . . ).

Figure 3:
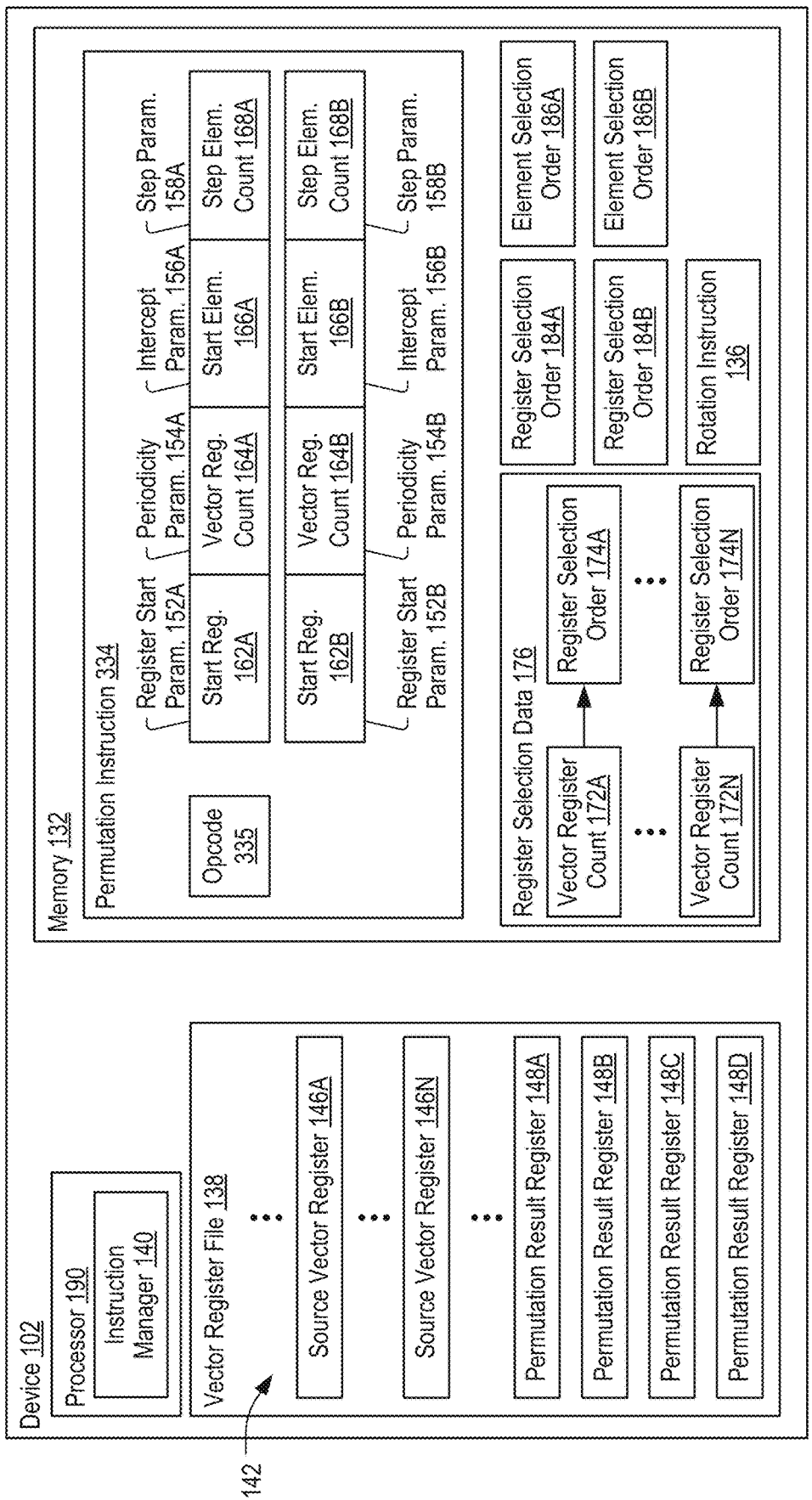
FIG. 3 is a block diagram of an illustrative aspect of the device of FIG. 1 operable to execute another permutation instruction, in accordance with some examples of the present disclosure.

Referring to FIG. 3, a diagram 300 of a particular illustrative aspect of the device 102 is shown. The instruction manager 140 is configured to execute a permutation instruction 334. The permutation instruction 334 includes multiple sets of parameters, as compared to the single set of parameters of the permutation instruction 134 of FIGS. 1-2. The permutation instruction 334 also includes an opcode 335. The opcode 335 corresponds to an identifier of the permutation instruction 334.

In some implementations, the permutation instruction 334 includes a first set of parameters (e.g., a register start parameter 152A, a periodicity parameter 154A, an intercept parameter 156A, a step parameter 158A, or a combination thereof) and a second set of parameters (e.g., a register start parameter 152B, a periodicity parameter 154B, an intercept parameter 156B, a step parameter 158B, or a combination thereof).

Figure 4:
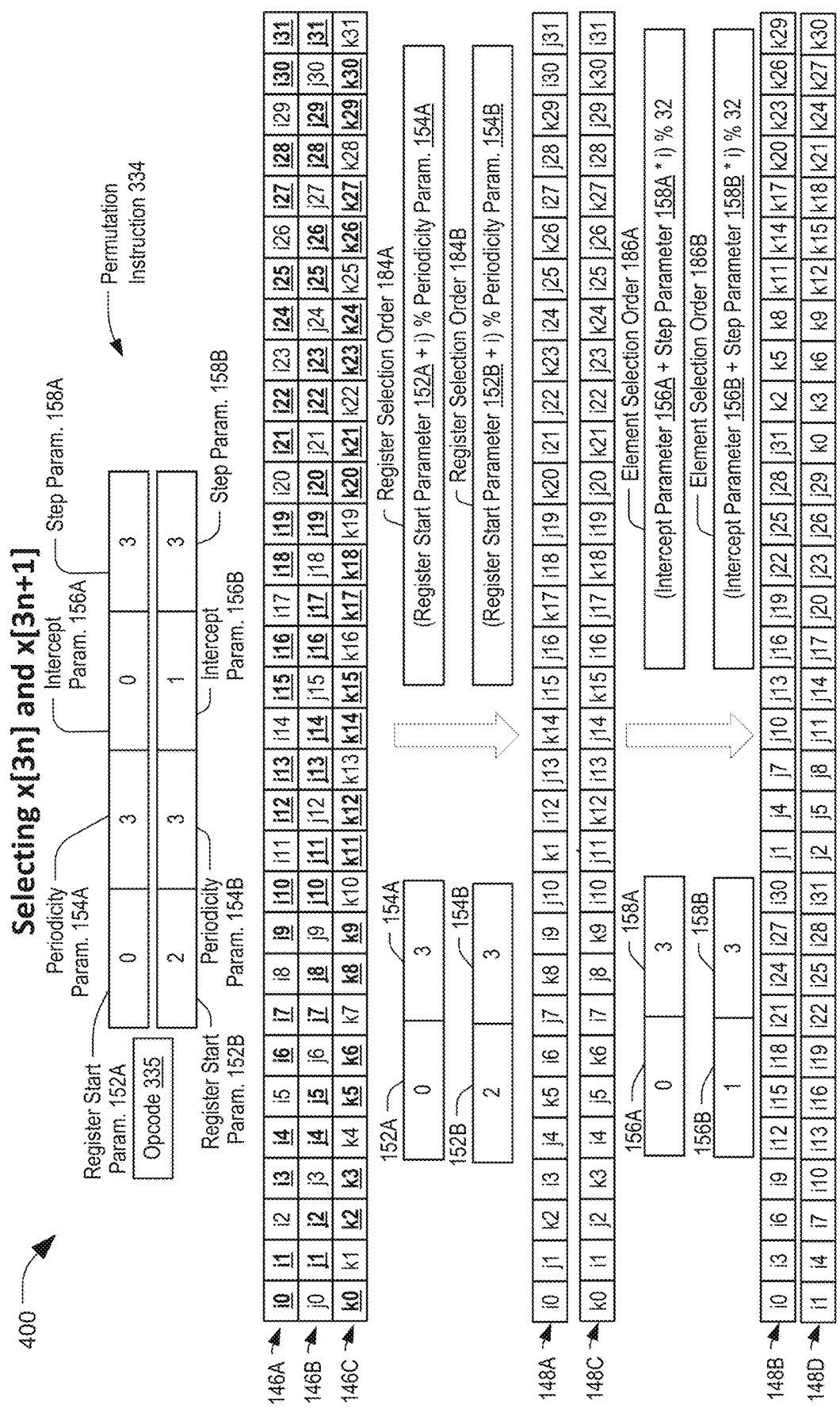
FIG. 4 is a diagram of an illustrative aspect of another example of execution of a permutation instruction by the device of FIGS. 1 and 3, in accordance with some examples of the present disclosure.

FIG. 4 depicts an example 400 of operation of the instruction manager 140, which illustrates aspects of executing the permutation instruction 334 for source data stored in source vector registers 146A-C and includes populating the permutation result register 148A based on the register start parameter 152A and the periodicity parameter 154A and populating a permutation result register 148C based on the register start parameter 152B and the periodicity parameter 154B, followed by populating the permutation result register 148B based on the intercept parameter 156A and the step parameter 158A and populating a permutation result register 148D based on the intercept parameter 156B and the step parameter 158B, as described in more detail below.

In the example 400, the register start parameter 152A (e.g., 0), the periodicity parameter 154A (e.g., 3), the intercept parameter 156A (e.g., 0), and the step parameter 158A (e.g., 3) correspond to a first filtering operation on the source data, such as selecting x[3n] or selecting every third source data value starting with the $0^{th}$ data value. The register start parameter 152B (e.g., 2), the periodicity parameter 154B (e.g., 3), the intercept parameter 156B (e.g., 1), and the step parameter 158B (e.g., 3) correspond to performing a second filtering operation on the source data, such as selecting x[3n+1], where "x" corresponds to source data and "n" is an integer greater than or equal to 0. For example, selecting x[3n+1] corresponds to selecting x[1], x[4], x[7], etc. or selecting every third source data value starting with the $1^{st}$ data value.

Returning to FIG. 3, the instruction manager 140 is configured to execute the permutation instruction 334 to perform two operations (e.g., the first filtering operation and the second filtering operation) on source data stored in the plurality of source vector registers 146. For example, the instruction manager 140 is configured to execute the permutation instruction 334 to generate, based on the first set of parameters, first final results of the first filtering operation in the permutation result register 148B by performing similar operations as described with reference to FIG. 1. To illustrate, the instruction manager 140 is configured to determine a start register 162A (e.g., indicated by the register start parameter 152A or a default value) and to determine the vector register count 164A (e.g., indicated by the periodicity parameter 154A). The instruction manager 140 is configured to determine a register selection order 184A based on the register selection data 176, the start register 162A, and the vector register count 164A, as described with reference to FIG. 1. The instruction manager 140 is configured to, during execution of the permutation instruction 334, generate a first intermediate result by populating the permutation result register 148A based on the register selection order 184A, as described with reference to FIG. 1. For example, as shown in the example 400 of FIG. 4, the permutation result register 148A includes every data value of interest (e.g., every third source data value starting from the $0^{th}$ data value) out of order.

The instruction manager 140 is configured to determine a start element 166A (e.g., as indicated by the intercept parameter 156A or a default value) and to determine a step element count 168A (e.g., as indicated by the step parameter 158A, the periodicity parameter 154A, or a default value). The instruction manager 140 is configured to determine an element selection order 186A based on the start element 166A and the step element count 168A, as described with reference to FIG. 1. The instruction manager 140 is configured to, during execution of the permutation instruction 334, generate the first final result by populating the permutation result register 148B based on the element selection order 186A, as described with reference to FIG. 1. For example, as shown in the example 400 of FIG. 4, the permutation result register 148B includes every data value of interest (e.g., every third source data value starting from the 0$^{th}$ data value) in order.

In a particular example, the instruction manager 140 is configured to execute the permutation instruction 334 to generate, based on the second set of parameters, second final results of the second filtering operation in a permutation result register 148D by performing similar operations as described with reference to FIG. 1. To illustrate, the instruction manager 140 is configured to determine a start register 162B (e.g., indicated by the register start parameter 152B or a default value) and to determine the vector register count 164B (e.g., indicated by the periodicity parameter 154B). The instruction manager 140 is configured to determine a register selection order 184B based on the register selection data 176, the start register 162B, and the vector register count 164B, as described with reference to FIG. 1. The instruction manager 140 is configured to, during execution of the permutation instruction 334, generate a second intermediate result by populating a permutation result register 148C based on the register selection order 184B, as described with reference to FIG. 1. For example, as shown in the example 400 of FIG. 4, the permutation result register 148C includes every data value of interest (e.g., every third source data value starting from the 1$^{st}$ data value) out of order.

The instruction manager 140 is configured to determine a start element 166B (e.g., as indicated by the intercept parameter 156B or a default value) and to determine a step element count 168B (e.g., as indicated by the step parameter 158B, the periodicity parameter 154B, or a default value). The instruction manager 140 is configured to determine an element selection order 186B based on the start element 166B and the step element count 168B, as described with reference to FIG. 1. The instruction manager 140 is configured to, during execution of the permutation instruction 334, generate the second final result by populating the permutation result register 148D based on the element selection order 186B, as described with reference to FIG. 1. For example, as shown in the example 400 of FIG. 4, the permutation result register 148D includes every data value of interest (e.g., every third source data value starting from the 1$^{st}$ data value) in order.

The permutation instruction 334 including two sets of parameters is provided as an illustrative non-limiting example. In other examples, a permutation instruction can include more than two sets of parameters to generate final results of performing more than two operations on the source data.

In the example 400, the periodicity parameter 154B indicates the same value as the periodicity parameter 154A, so the register selection order 184B follows a similar pattern (e.g., (register start parameter+i) % periodicity parameter)) as the register selection order 184A. The register selection order 184B indicates different values than the register selection order 184A because the register start parameter 152B indicates a value (e.g., 2) that is different from a value (e.g., 0) indicated by the register start parameter 152A. In some examples, a register selection order can follow a different pattern (e.g., instead of (register start parameter+i) % periodicity parameter)), as further described with reference to FIG. 5.

Figure 5:
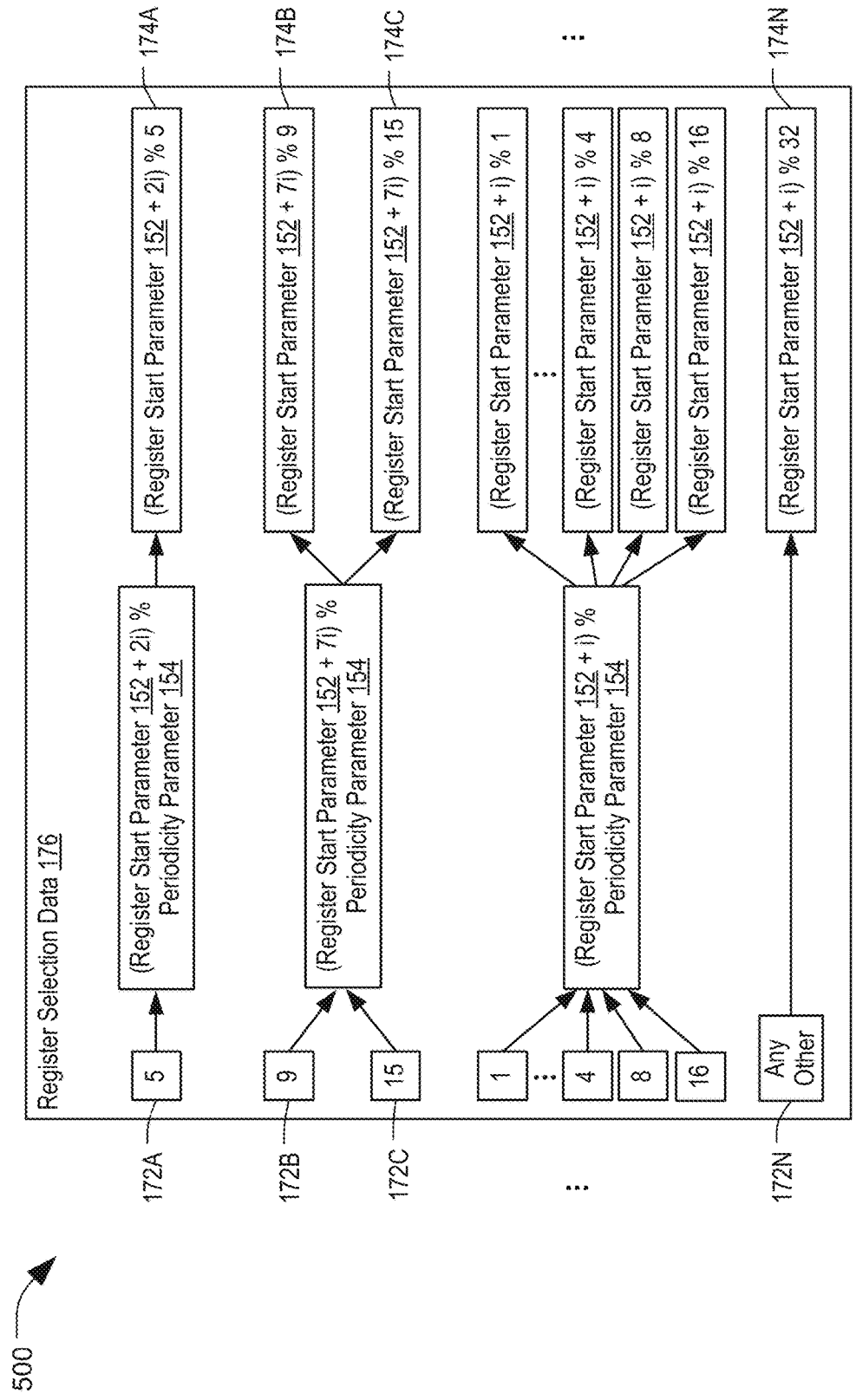
FIG. 5 is a diagram of an illustrative aspect of an example of register selection data used during execution of a permutation instruction by the device of FIGS. 1 and 3, in accordance with some examples of the present disclosure.

Referring to FIG. 5, an example 500 of the register selection data 176 is shown. The register selection data 176 maps the plurality of vector register counts 172 to the plurality of register selection orders 174.

The register selection data 176 indicates that a vector register count 172A (e.g., 5) corresponds to a register selection order 174A, such as ((register start parameter 152+2i) % (periodicity parameter 154)) or ((register start parameter 152+2i) % 5), where "i" corresponds to an element index and the register selection order 174A indicates a source register index corresponding to the element index i.

In some examples, multiple vector register counts 172 can correspond to register selection orders 174 that correspond to the same pattern but that indicate different source register index values for the same register start parameter 152. For example, a vector register count 172B (e.g., 9) corresponds to a register selection order 174B (e.g., (register start parameter 152+7i) % 9) and a vector register count 172C (e.g., 15) corresponds to a register selection order 174C (e.g., (register start parameter 152+7i) % 15). Each of the register selection order 174B and the register selection order 174C corresponds to the same register selection order pattern (e.g., (register start parameter 152+7i) % periodicity parameter 154). The register selection order 174B and the register selection order 174C indicate different source register index values for the same register start parameter 152 because the register selection order 174B and the register selection order 174C are based on different values indicated by the periodicity parameter 154.

In some examples, multiple vector register counts 172 can correspond to register selection orders 174 that correspond to the same pattern and that indicate the same source register index values for the same register start parameter 152. For example, each of vector register counts 172N (e.g., 6, 7, 10-14, and greater than or equal to 17) corresponds to the register selection order 174N (e.g., (register start parameter 152+i) % 32). The register selection order 174N indicates the same source register index values for each of the vector register counts 172N for the same register start parameter 152 because the register selection order 174N is independent of the periodicity parameter 154.

The plurality of register selection orders 174 are described in terms of the register start parameter 152, the periodicity parameter 154, or both, as an illustrative example. In more general cases, the plurality of register selection orders 174 can be described in terms of the start register 162, the vector register count 164, or both.

In a particular aspect, the register selection data 176 is determined based on the following equations. Each of the source vector registers 146 includes 32 elements. A source data index of a data value of the source data stored in the plurality of source vector registers 146 corresponds to: 32v+i, where "v" corresponds to a source register index and "i" corresponds to an element index where the data value is stored. For example, a data value having a source data index of 35 (e.g., the 35$^{th}$ source data value) is stored in an element having an element index of "3" of a source vector register 146 having a source register index of "1" (e.g., v=1, i=3, 32v+i=32+3=35). Each data value of interest for a filtering operation "x[mn]" corresponds to:

$$32v+i=mn \qquad \text{Equation 1}$$

where "m" corresponds to the vector register count 164 and "n" corresponds to an integer value greater than or equal to 0. Equation 1 can be rearranged as: mn−32v=i. For the vector register count 164 of 9, the filtering operation corresponds to:

$$9n-32v=i \qquad \text{Equation 2}$$

For the vector register count 164 of 9 and the 1$^{st}$ column of the source data in the plurality of source vector registers 146 corresponding to element index i of 1, the filtering operation corresponds to:

$$9n - 32v = 1 \qquad \text{Equation 3}$$

For the vector register count 164 of 9, the 0$^{th}$ data value of interest is stored in element 0 of the source vector register 146A, the 1$^{th}$ data value of interest is stored in element 9 of the source vector register 146A, and so on. Equation 3 is satisfied for n=25 and v=7. For example, for the vector register count 164 of 9, a data value of interest having an element index of 1 is the 25$^{th}$ source data value of interest (corresponding to n=25) and is in the source vector register corresponding to the source register index of 7 (corresponding to v=7). Equation 3 can be rewritten as:

$$9\hat{n} - 32\hat{v} = 1 \qquad \text{Equation 4}$$

where $\hat{n}=25$ and $\hat{v}=7$. Multiplying Equation 4 by i corresponds to:

$$9(\hat{n}.i) - 32(\hat{v}.i) = i \qquad \text{Equation 5}$$

Equation 5 is satisfied for all values of i from 0 to 31. For the vector register count 164 of 9, the register start parameter 152 of 0, and all values of i from 0 to 31, the register selection order 174B corresponds to $(\hat{v}.i) \% 9$, where $\hat{v}=7$. To illustrate, the register selection order 174B corresponds to:

$$(7i) \% 9 \qquad \text{Equation 6}$$

The register selection orders 174 for other values of the vector register count 164 can be determined in a similar manner.

Figure 6:
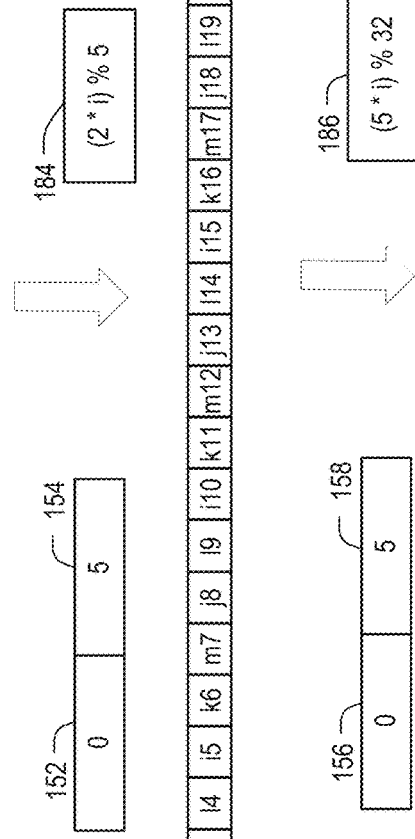
FIG. 6 is a diagram of an illustrative aspect of an example of execution of a permutation instruction by the device of FIG. 1, in accordance with some examples of the present disclosure.

Referring to FIG. 6, an example 600 of execution of the permutation instruction 134 of FIG. 1 is shown. For example, the instruction manager 140 of FIG. 1 performs one or more operations illustrated in the example 600 during execution of the permutation instruction 134. In some examples, similar operations may be performed during execution of the permutation instruction 334 of FIG. 3. In the example 600, the register start parameter 152 (e.g., 0), the periodicity parameter 154 (e.g., 5), the intercept parameter 156 (e.g., 0), and the step parameter 158 (e.g., 5) correspond to performing a filtering operation on the source data, such as selecting x[5n], where "x" corresponds to source data and "n" is an integer greater than or equal to 0. For example, selecting x[5n] corresponds to selecting x[0], x[5], x[10], etc., or selecting every fifth source data value starting with the 0$^{th}$ data value.

Source data is stored in the source vector register 146A, the source vector register 146B, the source vector register 146C, a source vector register 146D, and a source vector register 146E. The source vector register 146A, the source vector register 146B, the source vector register 146C, the source vector register 146D, and the source vector register 146E correspond to a first source register index (e.g., 0), a second source register index (e.g., 1), a third source register index (e.g., 2), a fourth source register index (e.g., 3), and a fifth source register index (e.g., 4), respectively.

The permutation result register 148A is populated by copying values of elements from source vector registers corresponding to non-successive source register index values. For example, the instruction manager 140 of FIG. 1, based on the register selection order 184, copies a value (e.g., i0) of a 0$^{th}$ element of the source vector register 146A corresponding to the first source register index (e.g., 0) to a 0$^{th}$ element of the permutation result register 148A, and copies a value (e.g., k1) of a 1$^{st}$ element of the source vector register 146C corresponding to the third source register index (e.g., 2) to a 1$^{st}$ element of the permutation result register 148A.

The intercept parameter 156 indicates a start element 166 (e.g., 0) and the step parameter 158 indicates a step element count 168 (e.g., 5). The permutation result register 148B is populated by copying values from the permutation result register 148A beginning with the start element 166 (e.g., the 0$^{th}$ element), followed by elements with element indices that are multiples of the step element count 168 (e.g., 5), and wrapping around to continue stepping through the elements of the permutation result register 148A based on the step element count 168 (e.g., 5). The permutation result register 148A thus stores an in-order sequence of every 5$^{th}$ source data value starting from the 0$^{th}$ source data value.

Figure 7:
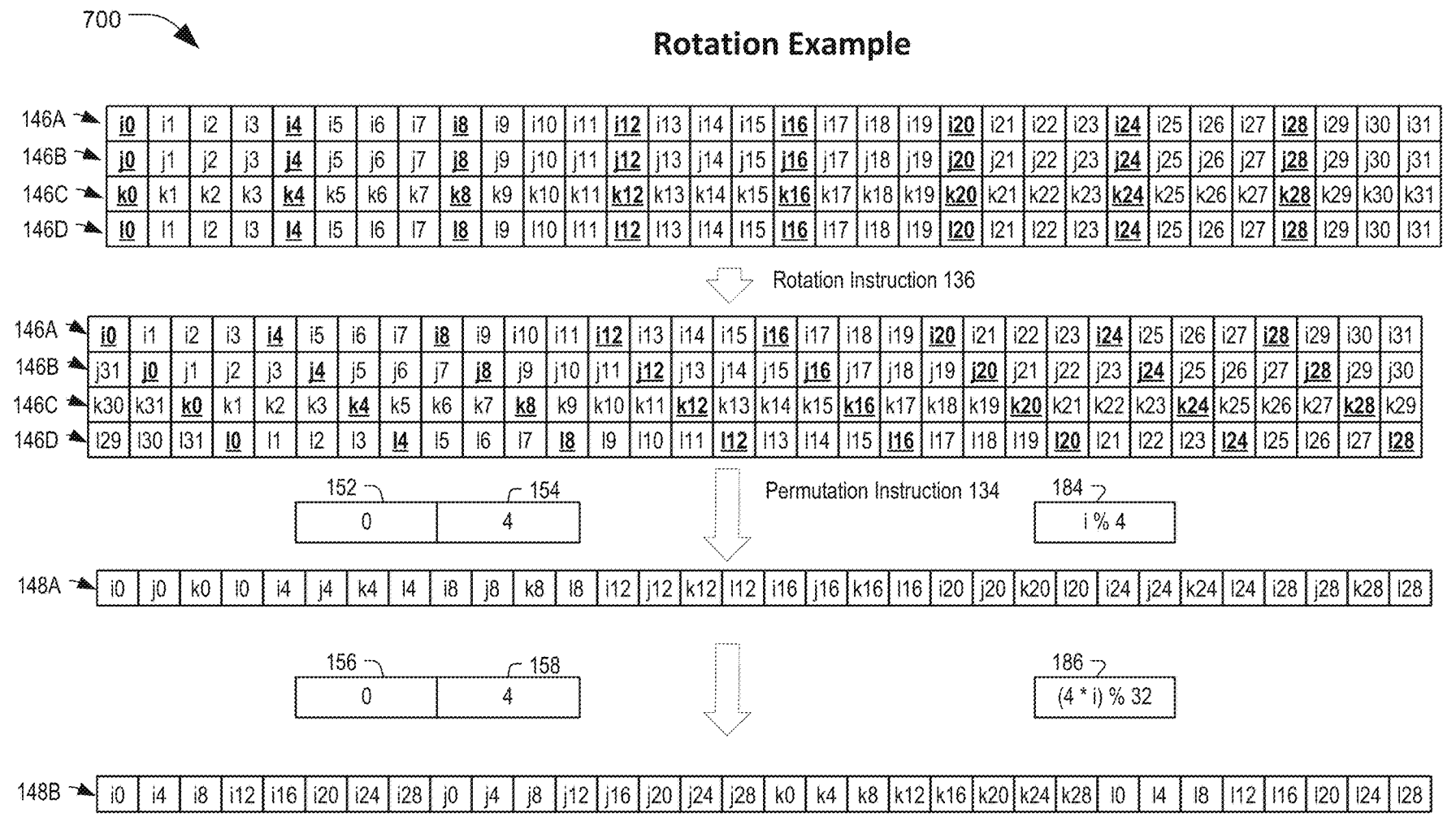

Referring to FIG. 7, an example 700 of execution of the rotation instruction 136 prior to execution of the permutation instruction 134 is shown. In a particular aspect, the instruction manager 140 of FIG. 1 executes the rotation instruction 136 to rotate positions of values of one or more of the plurality of source vector registers 146 prior to execution of the permutation instruction 134. In some examples, the instruction manager 140 can execute the rotation instruction 136 prior to execution of the permutation instruction 334 of FIG. 3.

In the example 700, the permutation instruction 134 having the register start parameter 152 (e.g., 0), the periodicity parameter 154 (e.g., 4), the intercept parameter 156 (e.g., 0), and the step parameter 158 (e.g., 4) corresponds to performing a filtering operation on the source data, such as selecting x[4n], where "x" corresponds to source data and "n" is an integer greater than or equal to 0. For example, selecting x[4n] corresponds to selecting x[0], x[4], x[8], etc., or selecting every fourth source data value starting with the 0$^{th}$ data value.

Each column of source data includes multiple data values of interest for the permutation instruction 134. A "data value of interest" as used herein corresponds to a data value that is to be included in a final result of executing a permutation instruction. For example, elements of multiple source vector registers 146 corresponding to the same element index (e.g., 0, 4, 8, 12, 16, 20, 24, or 28) include data values of interest. To illustrate, the 0$^{th}$ element of each of the source vector register 146A, the source vector register 146B, the source vector register 146C, and the source vector register 146D includes a data value of interest.

The instruction manager 140 performs the rotation instruction 136 to rotate positions of values stored in the source vector register 146B, the source vector register 146C, and the source vector register 146D by 1, 2, and 3, respectively. Subsequent to execution of the rotation instruction 136, each column of source data in the plurality of source vector registers 146 includes a single data value of interest. For example, a single one of the elements of multiple source vector registers 146 corresponding to the same element index (e.g., 0-31) includes a data value of interest. To illustrate, the 0$^{th}$ element of a single one of the source vector register 146A, the source vector register 146B, the source vector register 146C, and the source vector register 146D includes a data value of interest. The instruction manager 140 executes the permutation instruction 134 to populate the permutation result register 148A based on the source data in the plurality of source vector registers 146 and populates the permutation result register 148B based on a permutation of the values of the permutation result register 148A, as described with reference to FIG. 1.

Figure 8:
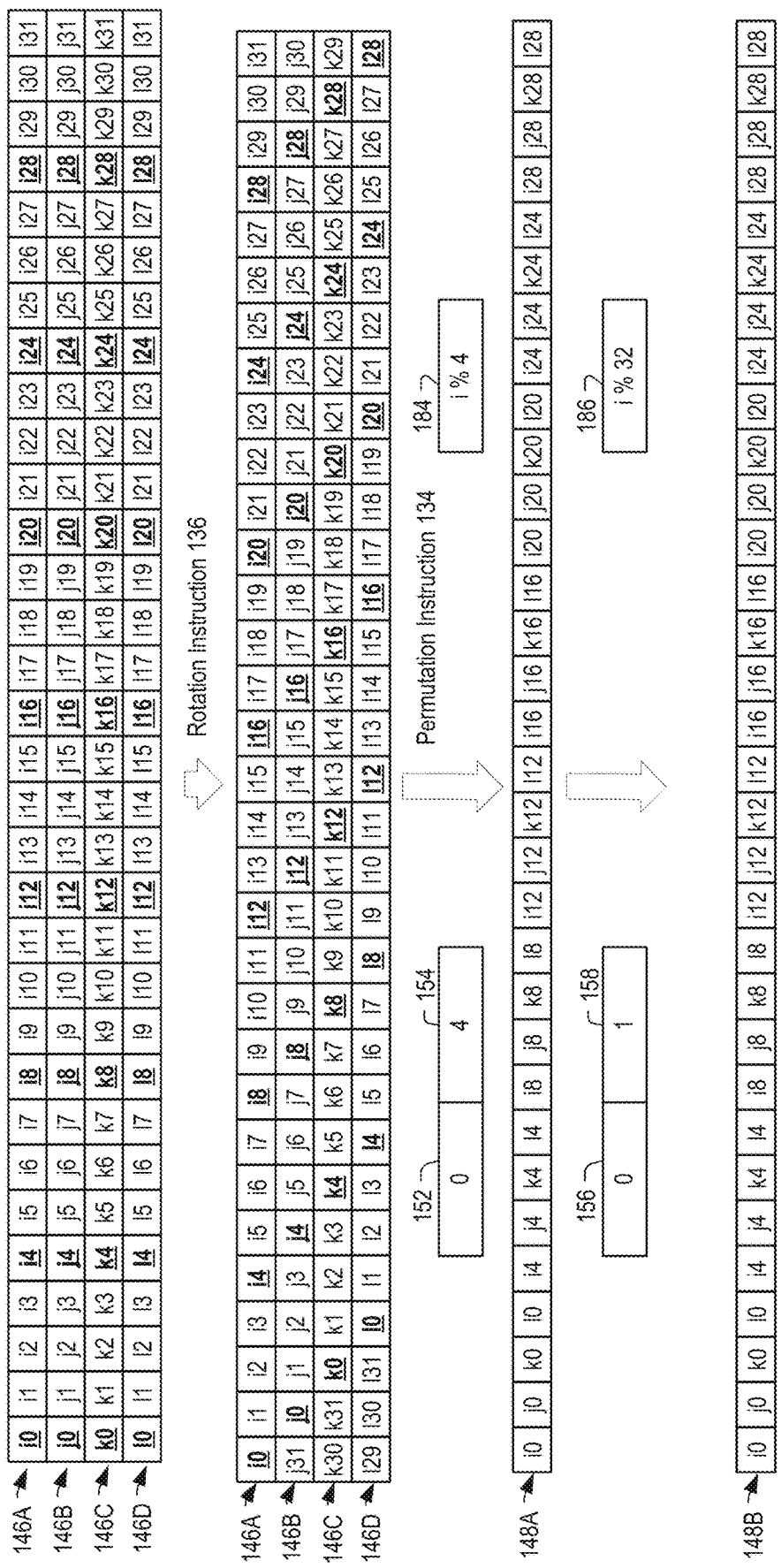
FIG. 8 is a diagram of an illustrative aspect of an example of execution of a permutation instruction by the device of FIG. 1 to perform a matrix transpose, in accordance with some examples of the present disclosure.
Figure 9:
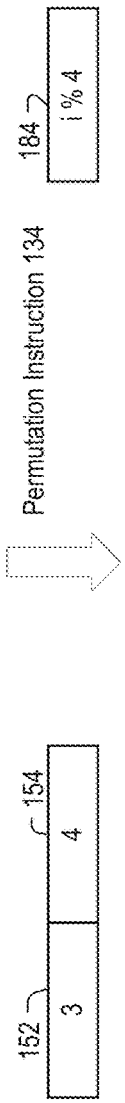
FIG. 9 is a diagram of an illustrative aspect of another example of execution of a permutation instruction by the device of FIG. 1 to perform the matrix transpose, in accordance with some examples of the present disclosure.

FIGS. 8-9 illustrate examples of multiple executions of the permutation instruction 134 corresponding to a matrix transpose. FIG. 8 depicts that a first execution of the permutation instruction 134 generates an output in a permutation result register 148B. FIG. 9 depicts that a second execution of the permutation instruction 134 generates an output in a permutation result register 148D. In an example of FIG. 9, the combination of the permutation result register 148B, the permutation result register 148D, a permutation result register 148F, and a permutation result register 148G corresponds to a transpose of a matrix stored in the source vector registers 146A-D.

Referring to FIG. 8, an example 800 of execution of the permutation instruction 134 is shown. In a particular aspect, the instruction manager 140 of FIG. 1 executes the permutation instruction 134 to perform a matrix transpose of values of one or more of the plurality of source vector registers 146.

In a first execution of the permutation instruction 134, a first column (e.g., the $0^{th}$ column) corresponds to a column of interest and every fourth column (e.g., corresponding to the vector register count 164) after the previous column of interest of the source data corresponds to a column of interest. Each value in a column of interest corresponds to a data value of interest. Similarly, for a second execution of the permutation instruction 134, a second column (e.g., the $1^{st}$ column) corresponds to a column of interest and every fourth column (e.g., corresponding to the vector register count 164) after the previous column of interest corresponds to a column of interest, as further described with reference to FIG. 9.

The instruction manager 140 executes the rotation instruction 136 prior to execution of the permutation instruction 134, as described with reference to FIG. 7. For example, the instruction manager 140 performs the rotation instruction 136 to rotate positions of values stored in the source vector register 146B, the source vector register 146C, and the source vector register 146D by 1, 2, and 3, respectively. Subsequent to execution of the rotation instruction 136, each column of source data in the plurality of source vector registers 146 includes a single data value of interest for a particular execution of the permutation instruction 134.

The instruction manager 140, during the first execution of the permutation instruction 134, populates the permutation result register 148A based on the register start parameter 152 (e.g., 0) and the periodicity parameter 154 (e.g., 4), as described with reference to FIG. 1. For example, each column of interest for the first execution of the permutation instruction 134 is included in the permutation result register 148A. The instruction manager 140, during the first execution of the permutation instruction 134, populates the permutation result register 148B based on the intercept parameter 156 (e.g., 0) and the step parameter 158 (e.g., 1), as described with reference to FIG. 1. For example, a particular value (e.g., 0) of the intercept parameter 156 and a particular value (e.g., 1) of the step parameter 158 correspond to copying values of elements of the permutation result register 148A to the permutation result register 148B without permutation. The permutation result register 148B corresponds to a transpose of each column of interest of the source data for the first execution of the permutation instruction 134. For example, the permutation result register 148B represents a row that includes each column of interest of the source data for the first execution of the permutation instruction 134.

Referring to FIG. 9, an example 900 of execution of the permutation instruction 134 is shown. To illustrate, the example 900 corresponds to a second execution of the permutation instruction 134 by the instruction manager 140 to perform a matrix transpose of values of one or more of the plurality of source vector registers 146.

Subsequent to execution of the rotation instruction 136, as described with reference to FIG. 8, each column of source data in the plurality of source vector registers 146 includes a single data value of interest for the second execution of the permutation instruction 134.

The instruction manager 140, during the second execution of the permutation instruction 134, populates the permutation result register 148C based on the register start parameter 152 (e.g., 3) and the periodicity parameter 154 (e.g., 4), as described with reference to FIG. 1. For example, each column of interest for the second execution of the permutation instruction 134 is included in the permutation result register 148C. The instruction manager 140, during the second execution of the permutation instruction 134, populates the permutation result register 148D based on the intercept parameter 156 (e.g., 1) and the step parameter 158 (e.g., 1), as described with reference to FIG. 1. The permutation result register 148D corresponds to a transpose of each column of interest of the source data for the second execution of the permutation instruction 134. To illustrate, the permutation result register 148D represents a row that includes each column of interest of the source data for the second execution of the permutation instruction 134.

In an example 950 of FIG. 9, after multiple executions of the permutation instruction 134, the permutation result register 148B represents a first row that includes each column of interest of the source data for the first execution of the permutation instruction 134, the permutation result register 148D represents a second row that includes each column of interest of the source data for the second execution of the permutation instruction 134, a permutation result register 148F represents a third row that includes each column of interest of the source data for a third execution of the permutation instruction 134, and a permutation result register 148G represents a fourth row that includes each column of interest of the source data for a fourth execution of the permutation instruction 134. The combination of the first row, second row, third row, and fourth row correspond to a matrix transpose of the source data (pre-rotation) of the source vector registers 146A-D. In some aspects the matrix transpose can be performed by two calls of the permutation instruction 334 as compared to four calls of the permutation instruction 134.

Using a permutation instruction (e.g., the permutation instruction 134 or the permutation instruction 334) to perform a matrix transpose is provided as an illustrative example. The permutation instruction can be used during or in preparation of performing other operations, such as a downsampling operation, a fast fourier kernel operation, or various other operations. For example, the permutation instruction can be used to perform filtering, as described with reference to FIG. 2, as part of a downsampling operation (e.g., downsampling by ⅓). As another example, the permutation instruction can be used to filter even data values to one or more first permutation result registers and to filter odd data values to one or more second permutation result registers as part of performing a fast fourier kernel operation.

Figure 10:
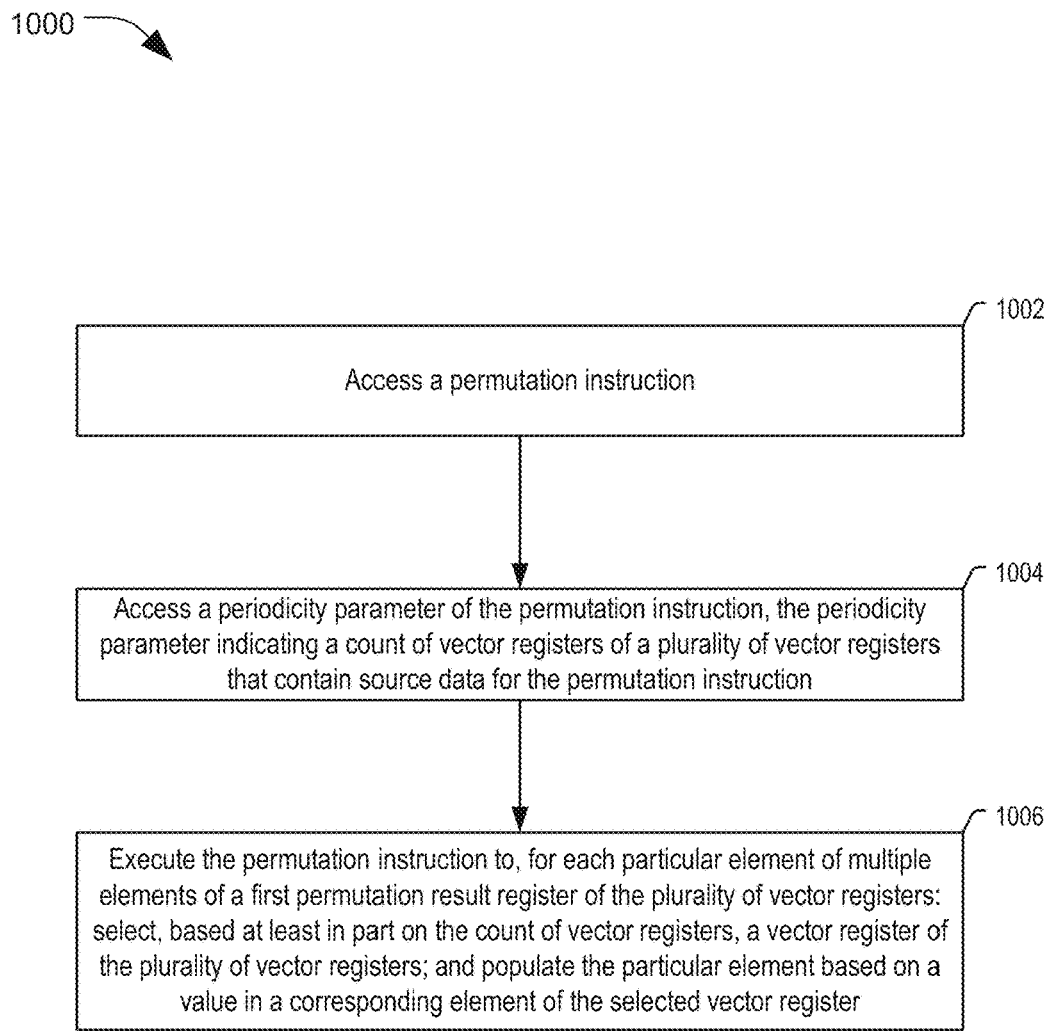
FIG. 10 is diagram of a particular implementation of a method of executing a permutation instruction that may be performed by the device of FIG. 1, in accordance with some examples of the present disclosure.

Referring to FIG. 10, a particular implementation of a method 1000 of executing a permutation instruction is shown. In a particular aspect, one or more operations of the method 1000 are performed by at least one of the instruction manager 140, the processor 190, the device 102 of FIG. 1, or a combination thereof.

The method 1000 includes accessing a permutation instruction, at 1002. For example, the instruction manager 140 receives a permutation instruction 134 from an instruction queue, as described with reference to FIG. 1.

The method 1000 includes accessing a periodicity parameter of the permutation instruction, at 1004. For example, the instruction manager 140 accesses the periodicity parameter 154 of the permutation instruction 134, as described with reference to FIG. 1. The periodicity parameter 154 indicates a vector register count 164 of the plurality of source vector registers 146 that contain source data for the permutation instruction 134. As another example, the instruction manager 140 accesses the periodicity parameter 154A and the periodicity parameter 154B of the permutation instruction 334, as described with reference to FIG. 3. The periodicity parameter 154A indicates the vector register count 164A of the plurality of source vector registers 146 that contain source data for populating the permutation result register 148A and the permutation result register 148B during execution of the permutation instruction 334. The periodicity parameter 154B indicates the vector register count 164B of the plurality of source vector registers 146 that contain source data for populating the permutation result register 148C and the permutation result register 148D during execution of the permutation instruction 334.

The method 1000 also includes executing the permutation instruction to, for each particular element of multiple elements of a first permutation result register of the plurality of vector registers, select a vector register of the plurality of vector registers based at least in part on the count of vector registers and populate the particular element based on a value in a corresponding element of the selected vector register, at 1006. For example, the instruction manager 140 executes the permutation instruction 134 to, for each element of the permutation result register 148A, select one of the plurality of source vector registers 146 based at least in part on the vector register count 164 and populate the particular element of the permutation result register 148A based on a value in a corresponding element of the selected one of the plurality of source vector registers 146, as described with reference to FIG. 1. As another example, the instruction manager 140 executes the permutation instruction 334 to, for each element of the permutation result register 148A, select one of the plurality of source vector registers 146 based at least in part on the vector register count 164A and populate the particular element of the permutation result register 148A based on a value in a corresponding element of the selected one of the plurality of source vector registers 146. The instruction manager 140 executes the permutation instruction 334 to, for each element of the permutation result register 148C, select one of the plurality of source vector registers 146 based at least in part on the vector register count 164B and populating the particular element of the permutation result register 148C based on a value in a corresponding element of the selected one of the plurality of source vector registers 146.

The method 1000 enables selection of one of the plurality of source vector registers 146 for an element of the permutation result register 148A based at least in part on a vector register count 164. Selecting a source vector register based on the vector register count 164 that can be stored as a scalar value reduces memory usage as compared to selecting a source vector register based on a vector register indicating a source vector register for each element of the permutation result register 148A.

The method 1000 of FIG. 10 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, firmware device, or any combination thereof. As an example, the method 1000 of FIG. 10 may be performed by a processor that executes instructions, such as described with reference to FIG. 11.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the device 102. In an illustrative implementation, the device 1100 may perform one or more operations described with reference to FIGS. 1-10.

In a particular implementation, the device 1100 includes a processor 1106 (e.g., a CPU). The device 1100 may include one or more additional processors 1110 (e.g., one or more DSPs, one or more GPUs, or a combination thereof). In a particular aspect, the processor 190 of FIG. 1 corresponds to the processor 1106, the processors 1110, or a combination thereof. In a particular aspect, the processors 1110 include the instruction manager 140. The processors 1110 may also include a speech and music coder-decoder (CODEC) 1108 that includes a voice coder ("vocoder") encoder 1136, a vocoder decoder 1138, or both.

The device 1100 may include the vector register file 138, the memory 132, and a CODEC 1134. The memory 132 may include instructions 1156 that are executable by the one or more additional processors 1110 (or the processor 1106) to implement the functionality described with reference to the instruction manager 140. The device 1100 may include a modem 1148 coupled, via a transceiver 1150, to an antenna 1152.

The device 1100 may include a display 1128 coupled to a display controller 1126. One or more speakers 1192, one or more microphones 1190, or a combination thereof, may be coupled to the CODEC 1134. The CODEC 1134 may include a digital-to-analog converter (DAC) 1102, an analog-to-digital converter (ADC) 1104, or both. In a particular implementation, the CODEC 1134 may receive analog signals from the one or more microphones 1190, convert the analog signals to digital signals using the analog-to-digital converter 1104, and provide the digital signals to the speech and music codec 1108. The speech and music codec 1108 may process the digital signals. In a particular implementation, the speech and music codec 1108 may provide digital signals to the CODEC 1134. The CODEC 1134 may convert the digital signals to analog signals using the digital-to-analog converter 1102 and may provide the analog signals to the one or more speakers 1192.

In a particular implementation, the device 1100 may be included in a system-in-package or system-on-chip device 1122. In a particular implementation, the memory 132, the vector register file 138, the processor 1106, the processors 1110, the display controller 1126, the CODEC 1134, and the modem 1148 are included in a system-in-package or system-on-chip device 1122. In a particular implementation, an input device 1130 and a power supply 1144 are coupled to the system-on-chip device 1122. Moreover, in a particular implementation, as illustrated in FIG. 11, the display 1128, the input device 1130, the one or more speakers 1192, the one or more microphones 1190, the antenna 1152, and the power supply 1144 are external to the system-on-chip device 1122. In a particular implementation, each of the display 1128, the input device 1130, the one or more speakers 1192, the one or more microphones 1190, the antenna 1152, and the power supply 1144 may be coupled to a component of the system-on-chip device 1122, such as an interface or a controller.

The device 1100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for accessing a periodicity parameter of a permutation instruction, the periodicity parameter indicating a count of vector registers of a plurality of vector registers that contain source data for the permutation instruction. For example, the means for accessing can correspond to one or more components of the instruction manager 140, the processor 190, the device 102 of FIG. 1, the processor 1106, the processors 1110, the device 1100, one or more other circuits or components configured to access a periodicity parameter of a permutation instruction, or any combination thereof.

The apparatus also includes means for executing the permutation instruction to, for each particular element of multiple elements of a first permutation result register of the plurality of vector registers, select a vector register of the plurality of vector registers based at least in part on the count and populate the particular element based on a value in a corresponding element of the selected vector register. For example, the means for executing can correspond to one or more components of the instruction manager 140, the processor 190, the device 102 of FIG. 1, the processor 1106, the processors 1110, the device 1100, one or more other circuits or components configured to access a periodicity parameter of a permutation instruction, or any combination thereof.

In some implementations, a non-transitory computer-readable medium (e.g., a computer-readable storage device, such as the memory 132) includes instructions (e.g., the instructions 1156) that, when executed by one or more processors (e.g., the processor 190, the one or more processors 1110, the processor 1106, or a combination thereof), cause the one or more processors to access a periodicity parameter (e.g., the periodicity parameter 154, the periodicity parameter 154A, the periodicity parameter 154B, or a combination thereof) of a permutation instruction (e.g., the permutation instruction 134, the permutation instruction 334, or both). The periodicity parameter indicates a count of vector registers (e.g., the vector register count 164, the vector register count 164A, the vector register count 164B, or a combination thereof) of a plurality of vector registers (e.g., the plurality of source vector registers 146) that contain source data for the permutation instruction. The instructions, when executed by the one or more processors, also cause the one or more processors to execute the permutation instruction to, for each particular element of multiple elements of a first permutation result register (e.g., the permutation result register 148A, the permutation result register 148C, or both) of the plurality of vector registers, select a vector register of the plurality of vector registers based at least in part on the count and populate the particular element based on a value in a corresponding element of the selected vector register.

Particular aspects of the disclosure are described below in sets of interrelated clauses:

According to Clause 1, a device includes: a vector register file including a plurality of vector registers; a memory configured to store a permutation instruction; and a processor configured to: access a periodicity parameter of the permutation instruction, the periodicity parameter indicating a count of a plurality of data sources that contain source data for the permutation instruction; and execute the permutation instruction to, for each particular element of multiple elements of a first permutation result register of the plurality of vector registers: select, based at least in part on the count of the plurality of data sources, a data source of the plurality of data sources; and populate the particular element based on a value in a corresponding element of the selected data source.

Clause 2 includes the device of Clause 1, wherein the plurality of data sources includes multiple vector registers of the plurality of vector registers.

Clause 3 includes the device of Clause 1 or Clause 2, wherein the permutation instruction is executed during or in preparation of a downsampling operation, a matrix transpose, or a fast fourier kernel operation.

Clause 4 includes the device of any of Clause 1 to Clause 3, wherein the processor is further configured to: access a start parameter of the permutation instruction, the start parameter indicating a particular data source of the plurality of data sources that contain source data, to populate an initial element of the first permutation result register; and based on at least in part on the start parameter, select elements of the plurality of data sources that contain source data to populate remaining elements of the first permutation result register.

Clause 5 includes the device of any of Clause 1 to Clause 4, wherein the processor is further configured to: determine a selection order based on the count of the plurality of data sources; and based at least in part on the selection order, select elements of the plurality of data sources that contain source data to populate the elements of the first permutation result register.

Clause 6 includes the device of Clause 5, wherein the memory is configured to store selection data indicating orders of data source selection corresponding to counts of data sources, and wherein the processor is configured to determine, based on the selection data, the selection order that corresponds to the count of the plurality of data sources.

Clause 7 includes the device of any of Clause 1 to Clause 6, wherein the processor is further configured to execute the permutation instruction to populate elements of a second permutation result register based on a permutation of values in the elements of the first permutation result register.

Clause 8 includes the device of Clause 7, wherein the processor is further configured to: access an intercept parameter, the intercept parameter indicating a particular element of the first permutation result register to populate an initial element of the second permutation result register; and based at least in part on the intercept parameter, populate the elements of the second permutation result register based on the values in the elements of the first permutation result register.

Clause 9 includes the device of Clause 7 or Clause 8, wherein the processor is further configured to: access a step parameter of the permutation instruction, the step parameter indicating an element selection order; and based at least in part on the element selection order, populate the elements of the second permutation result register based on the values in the elements of the first permutation result register.

Clause 10 includes the device of any of Clause 7 to Clause 9, wherein the processor is further configured to: determine an element selection order based on the count of the plurality of data sources; and based at least in part on the element selection order, populate the elements of the second permutation result register based on the values in the elements of the first permutation result register.

Clause 11 includes the device of any of Clause 1 to Clause 10, wherein the processor is configured to, prior to executing the permutation instruction, pre-process values in elements of at least one of the plurality of data sources that contain source data.

Clause 12 includes the device of any of Clause 1 to Clause 11, wherein the processor is configured to, prior to executing the permutation instruction, execute a rotation instruction to rotate positions of values in at least one of the plurality of data sources that contain source data.

Clause 13, includes the device of any of Clause 1 to Clause 12, wherein the permutation instruction includes a second periodicity parameter, wherein the second periodicity parameter indicates a second count of a second plurality of data sources that contain source data for the permutation instruction, and wherein executing the permutation instruction includes populating, based on the second count of the second plurality of data sources, elements of a particular permutation result register of the plurality of vector registers based on values in elements of the plurality of data sources.

According to Clause 14, a method includes: accessing, at a device, a permutation instruction; accessing, at the device, a periodicity parameter of the permutation instruction, the periodicity parameter indicating a count of vector registers of a plurality of vector registers that contain source data for the permutation instruction; and executing, at the device, the permutation instruction to, for each particular element of multiple elements of a first permutation result register of the plurality of vector registers: select, based at least in part on the count of vector registers, a vector register of the plurality of vector registers; and populate the particular element based on a value in a corresponding element of the selected vector register.

Clause 15 includes the method of Clause 14, further including: accessing, at the device, a register start parameter of the permutation instruction, the register start parameter indicating a particular vector register of the vector registers that contain source data, to populate an initial element of the first permutation result register; and based on at least in part on the register start parameter, selecting elements of the vector registers that contain source data to populate remaining elements of the first permutation result register.

Clause 16 includes the method of Clause 14 or Clause 15, further including: determining, at the device, a register selection order based on the count of vector registers; and based at least in part on the register selection order, selecting elements of the vector registers that contain source data to populate the elements of the first permutation result register.

Clause 17 includes the method of Clause 16, further including determining, based on register selection data, the register selection order that corresponds to the count of vector registers, the register selection data indicating orders of register selection corresponding to counts of vector registers.

Clause 18 includes the method of any of Clause 14 to Clause 17, wherein executing the permutation instruction includes populating elements of a second permutation result register based on a permutation of values in the elements of the first permutation result register.

Clause 19 includes the method of Clause 18, further including: accessing an intercept parameter, the intercept parameter indicating a particular element of the first permutation result register to populate an initial element of the second permutation result register; and based at least in part on the intercept parameter, populating the elements of the second permutation result register based on the values in the elements of the first permutation result register.

Clause 20 includes the method of Clause 18 or Clause 19, further including: accessing a step parameter of the permutation instruction, the step parameter indicating an element selection order; and based at least in part on the element selection order, populating the elements of the second permutation result register based on the values in the elements of the first permutation result register.

Clause 21 includes the method of any of Clause 18 to Clause 20, further including: determining, at the device, an element selection order based on the count of vector registers; and based at least in part on the element selection order, populating the elements of the second permutation result register based on the values in the elements of the first permutation result register.

Clause 22 includes the method of any of Clause 14 to Clause 21, further including, prior to executing the permutation instruction, pre-processing values in elements of at least one of the vector registers that contain source data.

Clause 23 includes the method of any of Clause 14 to Clause 22, further including, prior to executing the permutation instruction, executing a rotation instruction to rotate positions of values in at least one of the vector registers that contain source data.

According to Clause 24, a device includes: a memory configured to store instructions; and a processor configured to execute the instructions to perform the method of any of Clause 14 to 23.

According to Clause 25, a non-transitory computer-readable medium stores instructions that, when executed by a processor, cause the processor to perform the method of any of Clause 14 to Clause 23.

According to Clause 26, an apparatus includes means for carrying out the method of any of Clause 14 to Clause 23.

According to Clause 27, a non-transitory computer-readable medium stores instructions that, when executed by a processor, cause the processor to: access a periodicity parameter of a permutation instruction, the periodicity parameter indicating a count of vector registers of a plurality of vector registers that contain source data for the permutation instruction; and execute the permutation instruction to, for each particular element of multiple elements of a first permutation result register of the plurality of vector registers: select, based at least in part on the count of vector registers, a vector register of the plurality of vector registers; and populate the particular element based on a value in a corresponding element of the selected vector register.

Clause 28 includes the non-transitory computer-readable medium of Clause 27, wherein the instructions, when executed by the processor, cause the processor to: access a register start parameter of the permutation instruction, the register start parameter indicating a particular vector register of the vector registers that contain source data, to populate an initial element of the first permutation result register; and based on at least in part on the register start parameter, select elements of the vector registers that contain source data to populate remaining elements of the first permutation result register.

Clause 29 includes the non-transitory computer-readable medium of Clause 27 or Clause 28, wherein the instructions, when executed by the processor, cause the processor to: determine a register selection order based on the count of vector registers; and based at least in part on the register selection order, select elements of the vector registers that contain source data to populate the elements of the first permutation result register.

Clause 30 includes the non-transitory computer-readable medium of Clause 29, wherein the instructions, when executed by the processor, cause the processor to determine, based on register selection data, the register selection order that corresponds to the count of vector registers, wherein the register selection data indicates orders of register selection corresponding to counts of vector registers.

Clause 31 includes the non-transitory computer-readable medium of any of Clause 27 to Clause 30, wherein the instructions, when executed by the processor, cause the processor to execute the permutation instruction to populate elements of a second permutation result register based on a permutation of values in the elements of the first permutation result register.

Clause 32 includes the non-transitory computer-readable medium of Clause 31, wherein the instructions, when executed by the processor, cause the processor to: access an intercept parameter, the intercept parameter indicating a particular element of the first permutation result register to populate an initial element of the second permutation result register; and based at least in part on the intercept parameter, populate the elements of the second permutation result register based on the values in the elements of the first permutation result register.

Clause 33 includes the non-transitory computer-readable medium of Clause 31 or Clause 32, wherein the instructions, when executed by the processor, cause the processor to: access a step parameter of the permutation instruction, the step parameter indicating an element selection order; and based at least in part on the element selection order, populate the elements of the second permutation result register based on the values in the elements of the first permutation result register.

Clause 34 includes the non-transitory computer-readable medium of any of Clause 31 to Clause 33, wherein the instructions, when executed by the processor, cause the processor to: determine an element selection order based on the count of vector registers; and based at least in part on the element selection order, populate the elements of the second permutation result register based on the values in the elements of the first permutation result register.

Clause 35 includes an apparatus including: means for accessing a periodicity parameter of a permutation instruction, the periodicity parameter indicating a count of vector registers of a plurality of vector registers that contain source data for the permutation instruction; and means for executing the permutation instruction to, for each particular element of multiple elements of a first permutation result register of the plurality of vector registers: select, based at least in part on the count of vector registers, a vector register of the plurality of vector registers; and populate the particular element based on a value in a corresponding element of the selected vector register.

Clause 36 includes the apparatus of Clause 35, wherein at least one of the means for accessing or the means for executing is integrated into at least one of a communication device, a computer, a display device, a television, a gaming console, a digital video player, a camera, a navigation device, a vehicle, a headset, an augmented reality headset, a mixed reality headset, a virtual reality headset, an aerial vehicle, a home automation system, a voice-activated device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a vector register file including a plurality of vector registers comprising a set of source vector registers and a first permutation result register, wherein the set of source vector registers has a set count and the source vector registers contain source data for a permutation instruction that includes multiple parameters;
a memory configured to store the permutation instruction, wherein one or two of the multiple parameters are register selection order parameters that characterize a register selection order, wherein each of the register selection order parameters is a scalar value, wherein one of the register selection order parameters is a periodicity parameter indicating the set count of the set of source vector registers, wherein the register selection order indicates a repeated pattern of register selection, wherein the periodicity parameter indicates a length of the repeated pattern, and wherein a particular source vector register is included once during each iteration of the repeated pattern; and a processor configured to execute the permutation instruction to, for each particular element of multiple elements of the first permutation result register of the plurality of vector registers:
  select, based on the register selection order, a source vector register of the plurality of vector registers; and
  populate the particular element based on a value in a corresponding element of the selected source vector register.

2. The device of claim 1, wherein the permutation instruction also includes an intercept parameter and a step parameter, wherein the intercept parameter indicates a particular element of the first permutation result register to populate an initial element of a second permutation result register, and wherein the step parameter indicates an element selection order to populate elements of the second permutation result register based on values in the elements of the first permutation result register.

3. The device of claim 1, wherein the register selection order parameters identify an ordered list of elements from a plurality of source vector registers including a first source vector register and a second source vector register, and wherein the ordered list includes a first proper subset of elements from the first source vector register and a second proper subset of elements from the second source vector register.

4. The device of claim 1, wherein another of the register selection order parameters is a register start parameter indicating that the particular source vector register is to be used to populate an initial element of the first permutation result register.

5. The device of claim 1, wherein the processor is further configured to, based on determining that the particular element has a particular position in the first permutation result register, select an element having the particular position in the selected vector register as the corresponding element for populating the particular element of the first permutation result register.

6. The device of claim 5, wherein the memory is configured to store register selection data indicating orders of vector register selection corresponding to counts of vector registers, and wherein the processor is configured to determine, based on the register selection data, the register selection order that corresponds to the set count of the set of source vector registers.

7. The device of claim 1, wherein the processor is further configured to execute the permutation instruction to populate elements of a second permutation result register based on a permutation of values in the elements of the first permutation result register.

8. The device of claim 7, wherein the processor is further configured to:
  access an intercept parameter, the intercept parameter indicating a particular element of the first permutation result register to populate an initial element of the second permutation result register; and
  based at least in part on the intercept parameter, populate the elements of the second permutation result register based on the values in the elements of the first permutation result register.

9. The device of claim 7, wherein the processor is further configured to:
  access a step parameter of the permutation instruction, the step parameter indicating an element selection order; and
  based at least in part on the element selection order, populate the elements of the second permutation result register based on the values in the elements of the first permutation result register.

10. The device of claim 7, wherein the processor is further configured to:
  determine an element selection order based on the set count of the set of source vector registers; and
  based at least in part on the element selection order, populate the elements of the second permutation result register based on the values in the elements of the first permutation result register.

11. The device of claim 1, wherein the processor is configured to, prior to executing the permutation instruction, pre-process values in elements of at least one of the vector registers that contain source data.

12. The device of claim 1, wherein the processor is configured to, prior to executing the permutation instruction, execute a rotation instruction to rotate positions of values in at least one of the vector registers that contain source data.

13. The device of claim 1, wherein the permutation instruction includes a second periodicity parameter, wherein the second periodicity parameter indicates a second count of second vector registers that contain source data for the permutation instruction, and wherein executing the permutation instruction includes populating, based on the second count of the second vector registers, elements of a particular permutation result register of the plurality of vector registers based on values in elements of the second vector registers.

14. A method comprising:
  accessing, at a device, a permutation instruction that includes multiple parameters, wherein one or two of the multiple parameters are register selection order parameters that characterize a register selection order, wherein each of the register selection order parameters is a scalar value, wherein one of the register selection order parameters is a periodicity parameter indicating a count of vector registers of a plurality of vector registers that contain source data for the permutation instruction, wherein the register selection order indicates a repeated pattern of register selection, wherein the periodicity parameter indicates a length of the repeated pattern, and wherein a particular source vector register is included once during each iteration of the repeated pattern;
  and
  executing, at the device, the permutation instruction to, for each particular element of multiple elements of a first permutation result register of the plurality of vector registers:
    select, based on the register selection order, a vector register of the plurality of vector registers; and
    populate the particular element based on a value in a corresponding element of the selected vector register.

15. The method of claim 14, wherein another one of the register selection order parameters is a register start parameter indicating a particular vector register of the vector registers that contain source data, to populate an initial element of the first permutation result register.

16. The method of claim 14, further comprising, based on determining that the particular element has a particular position in the first permutation result register, selecting an element having the particular position in the selected vector register as the corresponding element for populating the particular element of the first permutation result register.

17. The method of claim 16, further comprising determining, based on register selection data, the register selection order that corresponds to the count of vector registers, the register selection data indicating orders of register selection corresponding to counts of vector registers.

18. The method of claim 14, wherein executing the permutation instruction includes populating elements of a second permutation result register based on a permutation of values in the elements of the first permutation result register.

19. The method of claim 18, further comprising:
accessing an intercept parameter, the intercept parameter indicating a particular element of the first permutation result register to populate an initial element of the second permutation result register; and
based at least in part on the intercept parameter, populating the elements of the second permutation result register based on the values in the elements of the first permutation result register.

20. The method of claim 18, further comprising:
accessing a step parameter of the permutation instruction, the step parameter indicating an element selection order; and
based at least in part on the element selection order, populating the elements of the second permutation result register based on the values in the elements of the first permutation result register.

21. A non-transitory computer-readable medium storing instructions that, when executed by a processor, cause the processor to:
access a permutation instruction that includes multiple parameters, wherein one or two of the multiple parameters are register selection order parameters that characterize a register selection order, wherein each of the register selection order parameters is a scalar value, and wherein one of the register selection order parameters is a periodicity parameter indicating a count of vector registers of a plurality of vector registers that contain source data for the permutation instruction, wherein the register selection order indicates a repeated pattern of register selection, wherein the periodicity parameter indicates a length of the repeated pattern, and wherein a particular source vector register is included once during each iteration of the repeated pattern; and
execute the permutation instruction to, for each particular element of multiple elements of a first permutation result register of the plurality of vector registers:
select, based on the register selection order, a vector register of the plurality of vector registers; and
populate the particular element based on a value in a corresponding element of the selected vector register.

22. The non-transitory computer-readable medium of claim 21, wherein another one of the register selection order parameters is a register start parameter indicating a particular vector register of the vector registers that contain source data, to populate an initial element of the first permutation result register.

23. The non-transitory computer-readable medium of claim 21, wherein the instructions, when executed by the processor, cause the processor to, based on determining that the particular element has a particular position in the first permutation result register, select an element having the particular position in the selected vector register as the corresponding element for populating the particular element of the first permutation result register.

24. The non-transitory computer-readable medium of claim 23, wherein the instructions, when executed by the processor, cause the processor to determine, based on register selection data, the register selection order that corresponds to the count of vector registers, wherein the register selection data indicates orders of register selection corresponding to counts of vector registers.

25. The non-transitory computer-readable medium of claim 21, wherein the instructions, when executed by the processor, cause the processor to execute the permutation instruction to populate elements of a second permutation result register based on a permutation of values in the elements of the first permutation result register.

26. The non-transitory computer-readable medium of claim 25, wherein the instructions, when executed by the processor, cause the processor to:
access an intercept parameter, the intercept parameter indicating a particular element of the first permutation result register to populate an initial element of the second permutation result register; and
based at least in part on the intercept parameter, populate the elements of the second permutation result register based on the values in the elements of the first permutation result register.

27. The non-transitory computer-readable medium of claim 25, wherein the instructions, when executed by the processor, cause the processor to:
access a step parameter of the permutation instruction, the step parameter indicating an element selection order; and
based at least in part on the element selection order, populate the elements of the second permutation result register based on the values in the elements of the first permutation result register.

28. The non-transitory computer-readable medium of claim 25, wherein the instructions, when executed by the processor, cause the processor to:
determine an element selection order based on the count of vector registers; and
based at least in part on the element selection order, populate the elements of the second permutation result register based on the values in the elements of the first permutation result register.

29. An apparatus comprising:
means for accessing a permutation instruction that includes multiple parameters, wherein one or two of the multiple parameters are register selection order parameters that characterize a register selection order, wherein each of the register selection order parameters is a scalar value, wherein one of the register selection order parameters is a periodicity parameter indicating a count of vector registers of a plurality of vector registers that contain source data for the permutation instruction, wherein the register selection order indicates a repeated pattern of register selection, wherein the periodicity parameter indicates a length of the repeated pattern, and wherein a particular source vector register is included once during each iteration of the repeated pattern; and
means for executing the permutation instruction to, for each particular element of multiple elements of a first permutation result register of the plurality of vector registers:
select, based on the register selection order, a vector register of the plurality of vector registers; and populate the particular element based on a value in a corresponding element of the selected vector register.

30. The apparatus of claim 29, wherein at least one of the means for accessing or the means for executing is integrated into at least one of a communication device, a computer, a display device, a television, a gaming console, a digital video player, a camera, a navigation device, a vehicle, a headset, an augmented reality headset, a mixed reality headset, a virtual reality headset, an aerial vehicle, a home automation system, a voice-activated device, an internet-of-things (IoT) device, a virtual reality (VR) device, a base station, or a mobile device.

* * * * *